US011580683B1

(12) United States Patent
Jain et al.

(10) Patent No.: US 11,580,683 B1
(45) Date of Patent: Feb. 14, 2023

(54) COHERENT EDITING OF VECTOR GRAPHICS

(71) Applicant: ADOBE INC., San Jose, CA (US)

(72) Inventors: Arushi Jain, Delhi (IN); Praveen Kumar Dhanuka, Howrah (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/482,851

(22) Filed: Sep. 23, 2021

(51) Int. Cl.
*G06T 11/60* (2006.01)

(52) U.S. Cl.
CPC .................................. *G06T 11/60* (2013.01)

(58) Field of Classification Search
CPC ........................................................ G06T 11/60
See application file for complete search history.

(56) References Cited

U.S. PATENT DOCUMENTS

| 2014/0033132 A1* | 1/2014 | Jain | G06F 3/04812 |
| | | | 715/862 |
| 2014/0300647 A1* | 10/2014 | Villegas | G06T 11/60 |
| | | | 345/666 |

OTHER PUBLICATIONS

3Felice, et al., "Beyond Snapping: Persistent, Tweakable Alignment and Distribution with StickyLines", In Proceedings of the 29th Annual Symposium on User Interface Software and Technology, UIST 2016, p. 133-144, New York, NY, USA, 2016, Association for Computing Machinery.
1illustrator, Envelope distort, Found on the internet: https://helpx.adobe.com/illustrator/using/reshape-using-envelopes.html, Last updated on Apr. 15, 2021.
2illustrator, Vector skulpting. Found on the internet: https://helpx.adobe.com/illustrator/using/puppet-warp.html, Last updated on Apr. 2, 2021.
4Wikipedia contributors, Procrustes analysis. Found on the internet: https://en.wikipedia.org/wiki/Procrustes_analysis, Wikipedia, the free encyclopedia, 2019.

* cited by examiner

*Primary Examiner* — Shivang I Patel
(74) *Attorney, Agent, or Firm* — F. Chau & Associates, LLC

(57) ABSTRACT

Systems and methods for image processing are described. One or more embodiments of the present disclosure compare a vector graphics object with a guide line to obtain an attachment point of the vector graphics object, modify the guide line to obtain a guide shape, extend a line through the attachment point to obtain a projected point on the guide shape, divide the guide shape based on the projected point to obtain a partial curve, and modify the vector graphics object based on the partial curve to obtain a modified vector graphics object.

20 Claims, 26 Drawing Sheets

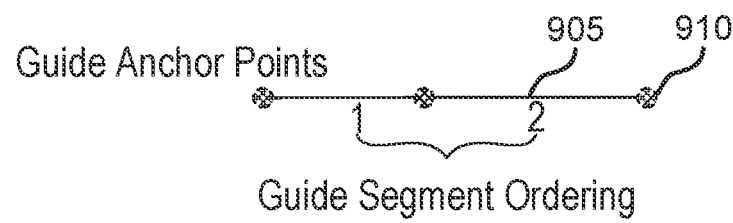
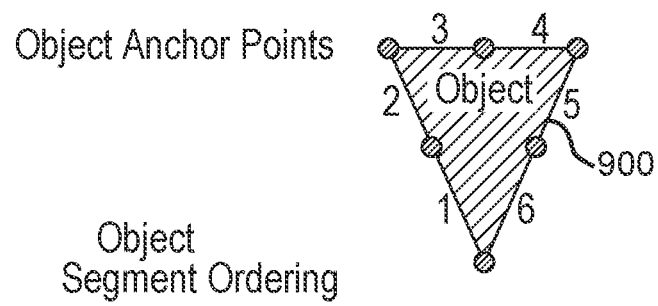
FIG. 9

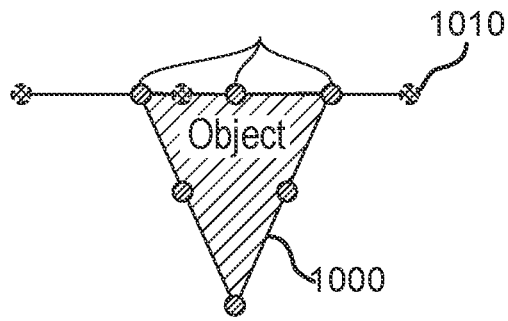
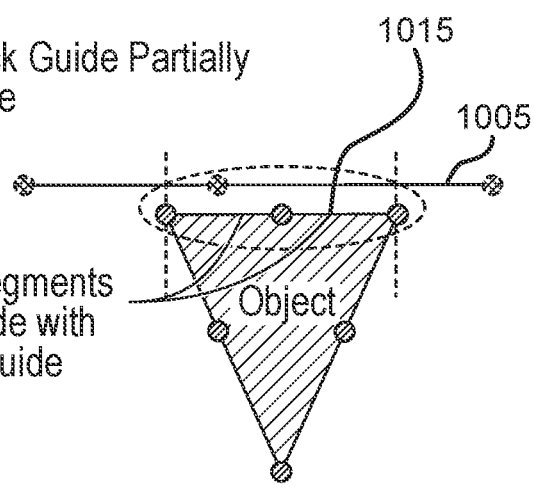
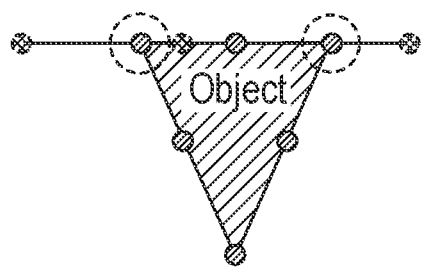
FIG. 10

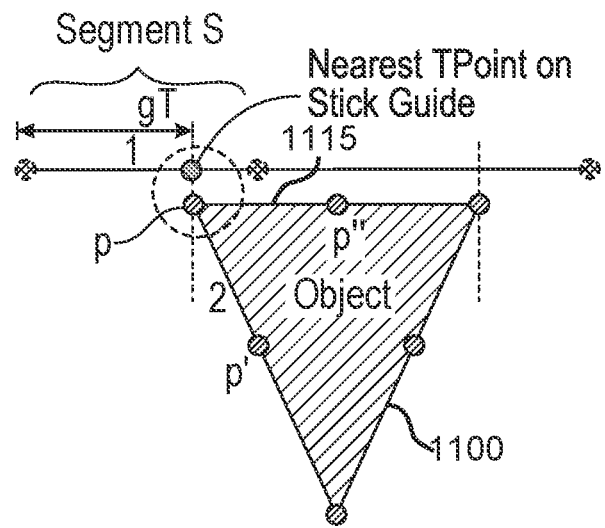
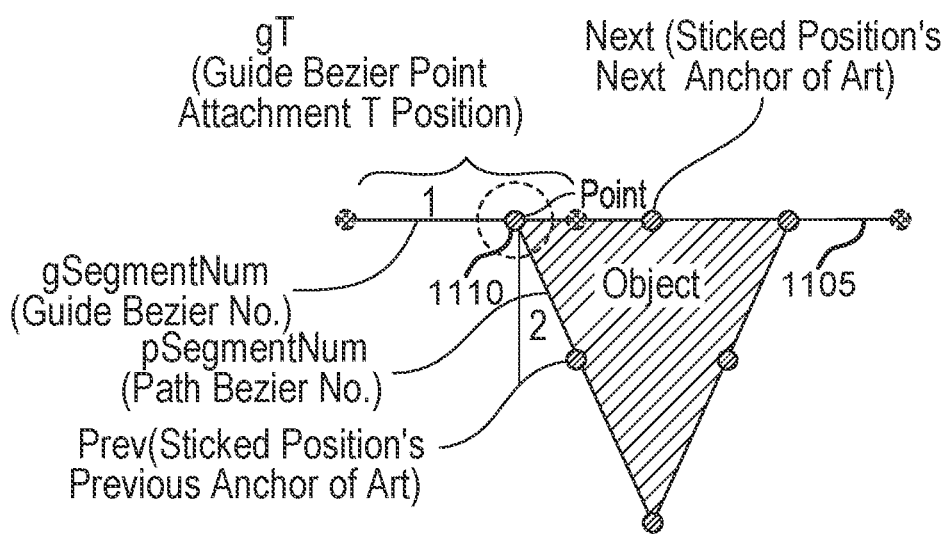
FIG. 11

Algorithm 1 Cache Creation

1: procedure CACHECREATION( )
2:   )Collect all the arts intersecting with the guide $G$ created/transformed
3:   for each ($o_i$) that intersects with $G$ do
4:     Need to fill the *StickedPositions* as attachedPoints if a part of the trajectory of art $o_i$ coincides with a part of linear stick guide's $G$ trajectory
5:     Extract the geometry of both guide $G$ and object $o_i$
6:     *StickedPositions* ← empty
7:     if DOPARTIALLYCOINCIDE($o_i$, $G$, *StickedPositions*) then
8:       Store all the *StickedPosition* within the $o_i$ itself (since it is a metadata of path attachment point to the attached magnetic guide)

FIG. 18

Algorithm 2 Do Partially Coincide

1: procedure DOPARTIALLYCOINCIDE($o_i$, $G$, $StickedPositions$)
2:    $G_E \leftarrow$ extract the line equation of the magnetic stick $G$ since its linear extension
3:    for each ($s_j$) segment of $o_i$ do
4:       if $s_j$ is a straight line and collinear with $G_E$ then
5:          for each ($p$) end point of $s_j$ segment of $o_i$ do
6:             $nearestTPoint \leftarrow$ Find the nearest point of $p$ on $G_E$
7:             $T \leftarrow$ T value of that $nearestTPoint$
8:             $D \leftarrow$ distance b/w the $nearestTPoint$ and $p$
9:             if $T <= 1$ and $D <= pointOverlapDelta$ then ▷ means point $p$ lies on the $G$ and not its
10:                 Create a $StickedPosition$ (if not duplicate entry in the vector)and Store the segment number of path as $gSemgentNum$ and its T position $T$ as $gT$ into the $StickedPosition$
11:                 Store the $s_j$ number as $pSemgentNum$
12:                 Store the $prev$ and the $next$ path segment points of $p$ of $o_i$ in $StickedPosition$ cache
13:    $StickedPositions =$ Store the list of adjacent coincident segments's stickedPositions in a vector
14:    if $StickedPositions$ not empty then return true
15:    else return false

FIG. 19

Algorithm 3 Magnetic Stick Edit Transformation

1: procedure MAGNETICSTICKEDITTRANSFORMATION($o_i$, $G$, $StickedPositions$)
2:     $EG \leftarrow$ Edited Guide
3:     for each ($o_i$) attached to guide $G$ in transformation do
4:         $StickedPositions \leftarrow$ Get the attached sticked positions cached in $o_i$
5:         $S1 \leftarrow$ First Sticked Position
6:         $S2 \leftarrow$ Last Sticked Position
7:         if CLOCKWISEORDERED($S1$, $S2$) then
8:             Bezier $B1 \leftarrow$ Get Bezier between points $S1.p$ and $S1.next$
9:             Bezier $B2 \leftarrow$ Get Bezier between points $S2.prev$ and $S2.p$
10:         else
11:             Bezier $B1 \leftarrow$ Get Bezier between points $S1.prev$ and $S1.p$
12:             Bezier $B2 \leftarrow$ Get Bezier between points $S2.p$ and $S2.next$
13:         Find the intersection position, (guide)segment number and (guide segment)T position of extended $B1$ and $B2$ with the edited guide via as follows:
14:         $T1, Seg1 \leftarrow$ GETBEZIERPROJECTIONONEDITEDGUIDE($S1.p$, $B1$, $EG$)
15:         $T2, Seg2 \leftarrow$ GETBEZIERPROJECTIONONEDITEDGUIDE($S2.p$, $B2$, $EG$)
16:         if If both Beziers $B1$ and $B2$ intersect on distinct segment of $EG$ ie., $S1! = S2$ then
17:             $EditedGuideSegEGS_1 \leftarrow$ GETEDITEDSEGMENTBEZIERPOINTS($EG$, $Seg1$, $T1$)
18:             $EditedGuideSegEGS_2 \leftarrow$ GETEDITEDSEGMENTBEZIERPOINTS($EG$, $Seg1$, $T2$)
19:         else
20:             $EditedGuideSegEGS_1, EGS_2 \leftarrow$ GETBEZIERPOINTSSAMESEG($EG$, $Seg1$, $T1$, $T2$)
21:         if want To make edges of end sticked positions sharp, we do as follows(don't want smooth) then
22:             $EGS_1.Seg.in \leftarrow EGS_1.Seg.p$
23:             $EGS_2.Seg.out \leftarrow EGS_2.Seg.p$
24:         EDITSTICKEDPATHSREDRAW ($o_i$, $EGS_1$, $EGS_2$)

FIG. 20

| Algorithm 4 ClockWise Ordered |
|---|
| 1: procedure CLOCKWISEORDERED(*StickedPosition1, StickePosition2*) |
| 2:    if attached path segments are consecutive then return S1-segment position > S2 segment position |
| 3:    elsereturn S1 segment position < S2 segment position |

Algorithm 5 Get Bezier Projection On Edited Guide

1: procedure GETBEZIERPROJECTIONONEDITEDGUIDE(*Point p*, *Bezier B*, *Edited Guide EG*)
2:     *ExtendedBezier* ← Extend the Bezier *B* from its endPoint *P*
3:     for each (*bg*) bezier of edited Guide *EG* do
4:         Find the intersection of *ExtendedBezier* with *b*
5:         if they intersect then
6:             Return the *b* bezier segment number and its intersection T position wrt *EG*

FIG. 22

Algorithm 6 Get Edited Guide Seg For Distinct Bezier

1: procedure GETEDITEDGUIDESEGFORDISTINCTBEZIER(*Path P, Seg S, T Position T*)
2:     Here, a bezier is represented as $p0, p1, p2, p3$
3:     Where, $p0$ and $p3$ are $p$ positions and $p1$ is *out* position of $p0$ and $p2$ is the *in* position of $p3$
4:     *Segments* ← Get the Segments of Path $P$
5:     *PathSize* ← Number of segments in the Path $P$
6:     Deduce the Bezier B at segment number $S$ as follows:
7:     $B.p0 \leftarrow Segments[S].p$
8:     $B.p1 \leftarrow Segments[S].out$
9:     $B.p2 \leftarrow Segments[(S+1)\%PathSize].in$
10:     $B.p3 \leftarrow Segments[(S+1)\%PathSize].p$
11:     Divide this Bezier B at the $T$ position to get the correct Bezier point:
12:     $B1, B2 \leftarrow$ AIREALBEZIERDIVIDE($B, T$)
13:     Edited Guide Segment at $T$ to maintain the continuity and prevent the Bezier aesthetics is detected as follows
14:     *EditedGuideSegment.prev* ← $B1.p1$
15:     *EditedGuideSegment.Seg.in* ← $B1.p2$
16:     *EditedGuideSegment.Seg.p* ← $B1.p3 = B2.p0$
17:     *EditedGuideSegment.Seg.out* ← $B2.p1$
18:     *EditedGuideSegment.next* ← $B2.p2$

FIG. 23

Algorithm 7 Get Edited Guide Seg For Same Bezier

1: procedure GETEDITEDGUIDESEGFORSAMEBEZIER(Path $P$, Seg $S$, T Position $T1$, $T2$)
2:      $B1, B2 \leftarrow$ GETEDITEDGUIDESEGFORDISTICTBEZIER ($P$, $S$, $T1$)
3:      $RemainingTVal \leftarrow 1 - T1$
4:      if $T2 > T1$ then
5:          $TNew \leftarrow (T2 - T1)/RemainingTVal$
6:          $B3, B4 \leftarrow$ AIREALBEZIERDIVIDE($B2$, $TNew$)
7:          Set the Edited Guide Segment 1 as follows:
8:          $EGS_1.prev \leftarrow B1.p1$
9:          $EGS_1.Seg.in \leftarrow B1.p2$
10:          $EGS_1.Seg.p \leftarrow B1.p3 = B3.p0$
11:          $EGS_1.Seg.out \leftarrow B3.p1$
12:          $EGS_1.next \leftarrow B3.p2$
13:          Set the Edited Guide Segment 2 as follows:
14:          $EGS_2.prev \leftarrow B3.p1$
15:          $EGS_2.Seg.in \leftarrow B3.p2$
16:          $EGS_2.Seg.p \leftarrow B3.p3 = B4.p0$
17:          $EGS_2.Seg.out \leftarrow B4.p1$
18:          $EGS_2.next \leftarrow B4.p2$
19:      else
20:          $TNew \leftarrow T2/T1$
21:          $B3, B4 \leftarrow$ AIREALBEZIERDIVIDE($B1$, $TNew$)
22:          Set the Edited Guide Segment 1 as follows:
23:          $EGS_1.prev \leftarrow B4.p1$
24:          $EGS_1.Seg.in \leftarrow B4.p2$
25:          $EGS_1.Seg.p \leftarrow B4.p3 = B2.p0$
26:          $EGS_1.Seg.out \leftarrow B2.p1$
27:          $EGS_1.next \leftarrow B2.p2$
28:          Set the Edited Guide Segment 2 as follows:
29:          $EGS_2.prev \leftarrow B3.p1$
30:          $EGS_2.Seg.in \leftarrow B3.p2$
31:          $EGS_2.Seg.p \leftarrow B3.p3 = B4.p0$
32:          $EGS_2.Seg.out \leftarrow B4.p1$
33:          $EGS_2.next \leftarrow B4.p2$

```
Algorithm 8 PreProcessing
1:  procedure PREPROCESSING
2:     if path segment is anti-clockwise ? then
3:         Reverse the order of segments in the path
4:         for each s segment in the path P do
5:             Reverse the in and out position of the segment too
6:     if the path segments of guide are anticlockwise OR if segments is same , but the attachment T
       position is anti-clockwise: then
7:         Reverse the order of segments in the path
8:         for each s segment in the path P do
9:             Reverse the in and out position of the segment too
10:        Reverse the previous and next control point position stored in cache too.
```

FIG. 25

Algorithm 9 EditStickedPathRecreationStep

1: procedure EDITSTICKEDPATHRECREATIONSTEP
2:    $NewPathSegments \leftarrow$ empty
3:    $p1 \leftarrow$ First $StickedPosition's\ pSegmentNum$
4:    for each $s_p$ segment of path objbect $o_i$ from 0 to $p1$ do
5:       $NewPathSegments.push(s_p)$
6:    Now push the EditedSegegment1 in NewPathSegments
7:    $NewPathSegments.push(EGS_1.Seg)$
8:    $g1 \leftarrow$ First $StickedPosition's\ gSegmentNum$
9:    $g2 \leftarrow$ Last $StickedPosition's\ gSegmentNum$
10:    for each $s_g$ segment of guide objbect G from $g1$ to $g2$ do
11:       if $s_g$ == segment $g1$ then
12:          Keep $s_g.in = EGS_1.next$
13:       if $s_g$ == segment $g2$-1 then
14:          Keep $s_g.out = EGS_1.prev$
15:       $NewPathSegments.push(s_p)$
16:    Now push the EditedSegegment2 in NewPathSegments
17:    $NewPathSegments.push(EGS_2.Seg)$
18:    $p2 \leftarrow$ Last $StickedPosition's\ pSegmentNum$
19:    for each $s_p$ segment of path objbect $o_i$ from $p2$ to end do
20:       $NewPathSegments.push(s_p)$
21:    Now redraw the path with $NewPathSegments$

FIG. 26

COHERENT EDITING OF VECTOR GRAPHICS

BACKGROUND

The following relates generally to digital image processing, and more specifically to editing vector graphics objects.

Digital image processing refers to the use of a computer to edit digital images using a processing network or an algorithm. In some cases, digital editing may be performed on images using image editing software to increase general appeal and consistency of the image. In some examples, the vector geometry of an image such as vector graphics objects can be represented by quadratic or cubic Bezier curves. Editing these Bezier segments may be performed by vector applications such as Adobe® Illustrator. Accordingly, users can manipulate anchor points or corresponding control points to edit Bezier curves.

Conventional image editing systems for editing graphic objects are not able to edit multiple vector graphics objects simultaneously to ensure visual consistency and coherence across segments of the vector graphics objects. Thus, when images include multiple different vector graphic objects, maintaining an inherent relationship between the vector graphic objects during editing is challenging. For example, a designer using conventional image editing systems has to edit each individual object and manually maintain the visual coherence and consistency of the multiple objects. Therefore, there is a need in the art for improved vector graphics systems to jointly edit multiple vector graphic objects while maintaining visual coherence.

SUMMARY

The present disclosure describes systems and methods for image processing. Some embodiments of the present disclosure include a vector graphics apparatus to modify a vector graphics object based on a partial curve to obtain a modified vector graphics object. In some examples, the vector graphics apparatus can jointly edit Bezier segments of multiple vector graphics objects while maintaining visual constraints and coherence across segments of the different vector graphics objects. According to some embodiments, a vector graphics apparatus is configured to compare a vector graphics object with a magnetic guide (e.g., a guide line) to obtain an attachment point of the vector graphics object. Additionally, the guide line may be modified to obtain a guide shape.

A method, apparatus, and non-transitory computer readable medium for image processing are described. One or more embodiments of the method, apparatus, and non-transitory computer readable medium include comparing a vector graphics object with a guide line to obtain an attachment point of the vector graphics object; modifying the guide line to obtain a guide shape; extending a line through the attachment point to obtain a projected point on the guide shape; dividing the guide shape based on the projected point to obtain a partial curve; and modifying the vector graphics object based on the partial curve to obtain a modified vector graphics object.

A method, apparatus, and non-transitory computer readable medium for image processing are described. One or more embodiments of the method, apparatus, and non-transitory computer readable medium include comparing a vector graphics object with a guide line to obtain an attachment point of the vector graphics object; modifying the guide line to obtain a guide shape; identifying an immediately previous point relative to the attachment point on the vector graphics object; identifying a previous segment of the vector graphics object based on the immediately previous point; extending the previous segment to obtain a projected point that intersects with the guide shape; dividing the guide shape based on the projected point to obtain a partial curve; removing a segment of the vector graphics object that overlaps the attachment point; and including the partial curve in the vector graphics object to obtain a modified vector graphics object.

An apparatus and method for image processing are described. One or more embodiments of the apparatus and method include an attachment component configured to compare a vector graphics object with a guide line to obtain an attachment point of the vector graphics object; a guide line component configured to modify the guide line to obtain a guide shape; a projection component configured to extend the attachment point to obtain a projected point on the guide shape; a partial curve component configured to divide the guide shape based on the projected point to obtain a partial curve; and a modification engine configured to modify the vector graphics object based on the partial curve to obtain a modified vector graphics object.

BRIEF DESCRIPTION OF THE DRAWINGS

FIG. 9 shows an example of a vector graphics object, a guide line, and anchor points according to aspects of the present disclosure.

FIG. 10 shows an example of a process for determining a segment of an object is parallel to a guide line according to aspects of the present disclosure.

FIG. 11 shows an example of a process for generating an attachment point according to aspects of the present disclosure.

FIG. 18 shows an example of an algorithm for cache creation according to aspects of the present disclosure.

FIG. 19 shows an example of an algorithm for determining whether or not a guide line partially coincides with an object according to aspects of the present disclosure.

FIG. 20 shows an example of an algorithm for guide line edit transformation according to aspects of the present disclosure.

FIG. 22 shows an example of an algorithm for Bezier projection according to aspects of the present disclosure.

FIG. 23 shows an example of an algorithm for obtaining edited guide segment for distinct Bezier according to aspects of the present disclosure.

FIG. 24 shows an example of an algorithm for obtaining edited guide segment for same Bezier according to aspects of the present disclosure.

FIG. 25 shows an example of an algorithm for preprocessing according to aspects of the present disclosure.

FIG. 26 shows an example of an algorithm for path recreation according to aspects of the present disclosure.

DETAILED DESCRIPTION

Figure 1:
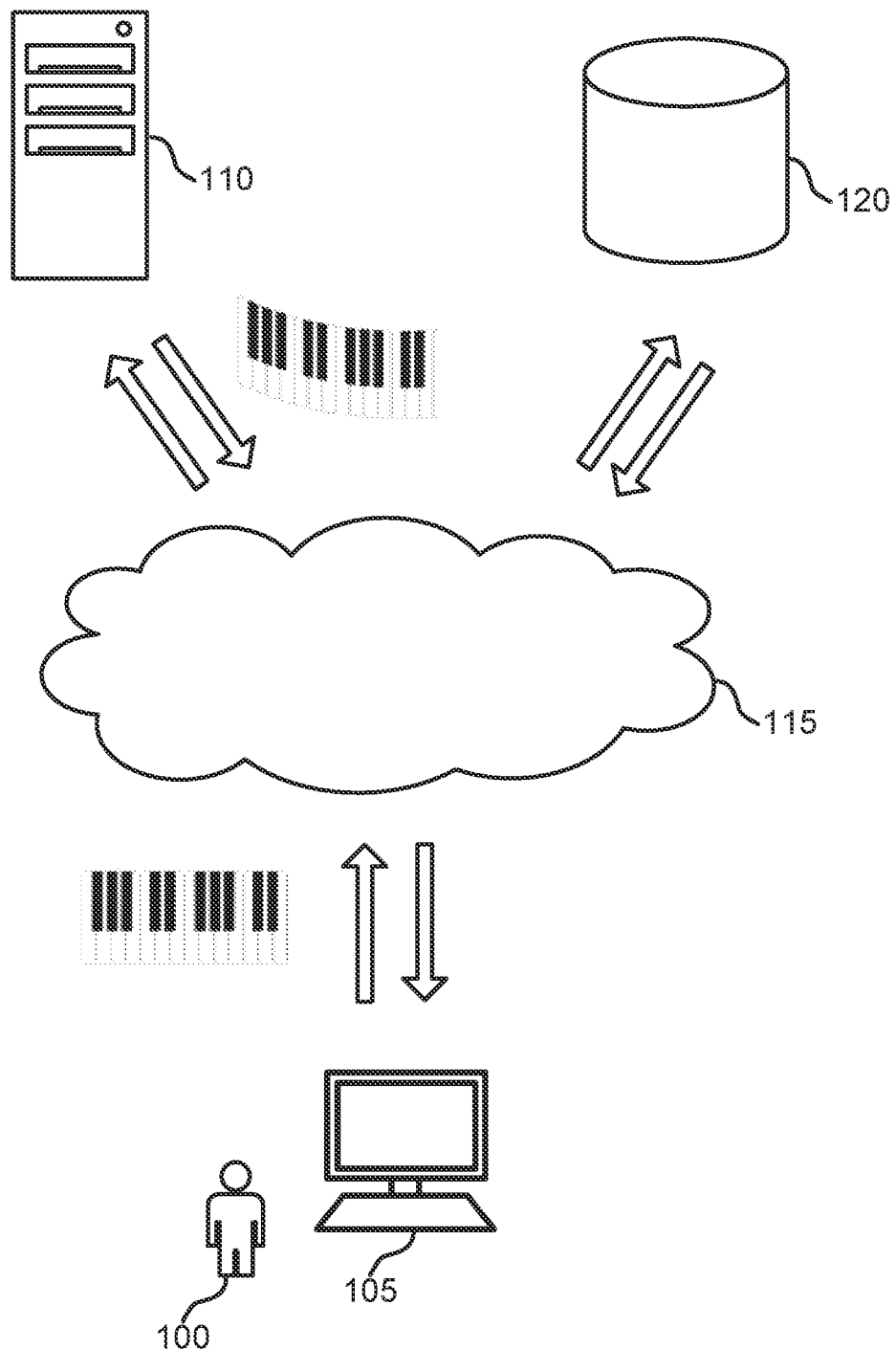
FIG. 1 shows an example of an image processing system according to aspects of the present disclosure.

The present disclosure describes systems and methods for image processing. Some embodiments of the present disclosure include a vector graphics apparatus that can edit multiple vector graphics objects in a coherent manner. For example, the vector graphics apparatus can jointly edit Bezier segments of multiple vector graphics objects while maintaining visual constraints and coherence across segments of the different vector graphics objects. According to some embodiments, a user provides a vector graphics object and connects the vector graphics object with a magnetic guide (e.g., a guide line). The vector graphics apparatus computes an attachment point of the vector graphics object, which is used to modify a portion of the vector graphics object.

Computer graphics systems can be used to edit vector objects, which can include curved segments represented by quadratic or cubic curves. Conventionally, to edit these graphics, users manually select anchor or control points. Alternatively, vector sculpting methods may be used to perform editing of individual vector object. Reshaping vector graphics objects may also be performed using envelope distort tool (e.g., using Adobe® Illustrator). However, these methods are insufficient to perform partial editing or to apply coherence in partial segments. Additionally, conventional editing methods depend on an explicit user selection of a group of objects.

Embodiments of the present disclosure include a vector graphics apparatus capable of editing multiple vector graphics objects simultaneously while maintaining coherent visual relationships across the objects within an image. A vector graphics apparatus of the present disclosure can automatically select anchor points based on "magnetic" guides that can attach to anchor points automatically. As a result, a user can edit the position of a segment or curve across multiple anchor points without interacting directly with each of the anchor points.

The magnetic guides (e.g., guide lines) can be configured to maintain coherence of attached vector graphics objects to enable consistent editing of the objects. In some cases, editing may be performed on partial segments of different vector graphics objects. In some cases, partial segments of vector objects are edited without explicit selection of anchor points or control points. For example, the vector graphics objects may be automatically attached to magnetic guides.

Vector graphics objects can include path objects, text objects, image objects, etc. In some examples, a graphics data structure may include a list of magnetic guides with which an vector graphics object is attached. A magnetic guide is an object in a vector design application used for alignment and precise positioning. The terms "magnetic guide" and "guide line" can be used interchangeably.

According to an embodiment, a vector graphics apparatus compares a vector graphics object with a guide line to obtain an attachment point of the vector graphics object, modifies the guide line to obtain a guide shape, extends a line through the attachment point to obtain a projected point on the guide shape, divides the guide shape based on the projected point to obtain a partial curve, and modifies the vector graphics object based on the partial curve to obtain a modified vector graphics object.

Embodiments of the present disclosure may be used in the context of image editing application. An example application in the image editing context is provided with reference to FIGS. 1-4. Details regarding the architecture of an example vector graphics apparatus are provided with reference to FIGS. 5-6. Examples of a process for modifying a vector graphics object based on a guide line are provided with reference to FIGS. 7-17.

Image Processing System

FIG. 1 shows an example of an image processing system according to aspects of the present disclosure. The example shown includes user 100, user device 105, vector graphics apparatus 110, cloud 115, and database 120. Vector graphics apparatus 110 is an example of, or includes aspects of, the corresponding element described with reference to FIG. 5.

In the example of FIG. 1, user 100 may provide a set of vector graphics objects. For example, objects could be a piano with chords such that each chord of the piano is identified as a vector graphics object. The user device 105 transmits the set of vector graphics objects to the vector graphics apparatus 110. For each of the objects, vector graphics apparatus 110 is configured to compare the vector graphics object with a guide line to obtain an attachment point of the vector graphics object.

The user 100 communicates with the vector graphics apparatus 110 via the user device 105 and the cloud 115. For example, user 100 is a designer editing a set of vector graphics objects to obtain customized design. User 100 can modify the guide line to obtain a guide shape using the vector graphics apparatus 110. In some examples, the user device 105 communicates with the vector graphics apparatus 110 via the cloud 115. Although in the example of FIG. 1, the vector graphics apparatus 110 is shown as connected to the user device 105 via cloud 115, in other examples the vector graphics apparatus 110 is located within the user device 105 (e.g., as a desktop software application).

In some embodiments, the vector graphics apparatus 110 extends a line through an attachment point to obtain a projected point on the guide shape and divides the guide shape based on the projected point to obtain a partial curve. Vector graphics apparatus 110 modifies the set of vector graphics objects based on the partial curve to obtain a set of modified vector graphics objects. The set of modified vector graphics objects follows a visual coherence such that the bottom of chords of piano forms a nice smooth curve.

In some embodiments, the user device 105 includes a user interface so that a user 100 can upload a vector graphics object via the user interface. A user interface may enable a user 100 to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

The user device 105 may be a personal computer, laptop computer, mainframe computer, palmtop computer, personal assistant, mobile device, or any other suitable processing apparatus. In some examples, the user device 105 includes software that incorporates an image processing application (e.g., vector graphics application). The vector graphics application may either include or communicate with vector graphics apparatus 110.

Vector graphics apparatus 110 includes a computer implemented system comprising an attachment component, a guide line component, a projection component, a partial curve component, and a modification engine. The system compares a vector graphics object with a guide line to obtain an attachment point of the vector graphics object, modifies the guide line to obtain a guide shape, extends a line through the attachment point to obtain a projected point on the guide shape, divides the guide shape based on the projected point to obtain a partial curve, and modifies the vector graphics object based on the partial curve to obtain a modified vector graphics object.

Vector graphics apparatus 110 may also include a processor unit and a memory unit. Additionally, vector graphics apparatus 110 can communicate with the database 120 via the cloud 115. Further detail regarding the architecture of vector graphics apparatus 110 is provided with reference to FIGS. 5-6. Further detail regarding a process for object modification is provided with reference to FIGS. 7-17. Further detail regarding algorithms for modifying a vector graphics object using vector graphics apparatus 110 is provided with reference to FIGS. 18-26.

In some cases, vector graphics apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated as an edge server if it has a direct or close connection to a user. In some cases, a cloud 115 is limited to a single organization. In other examples, the cloud is available to many organizations. In one example, a cloud includes a multi-layer communications network comprising multiple edge routers and core routers. In another example, a cloud is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
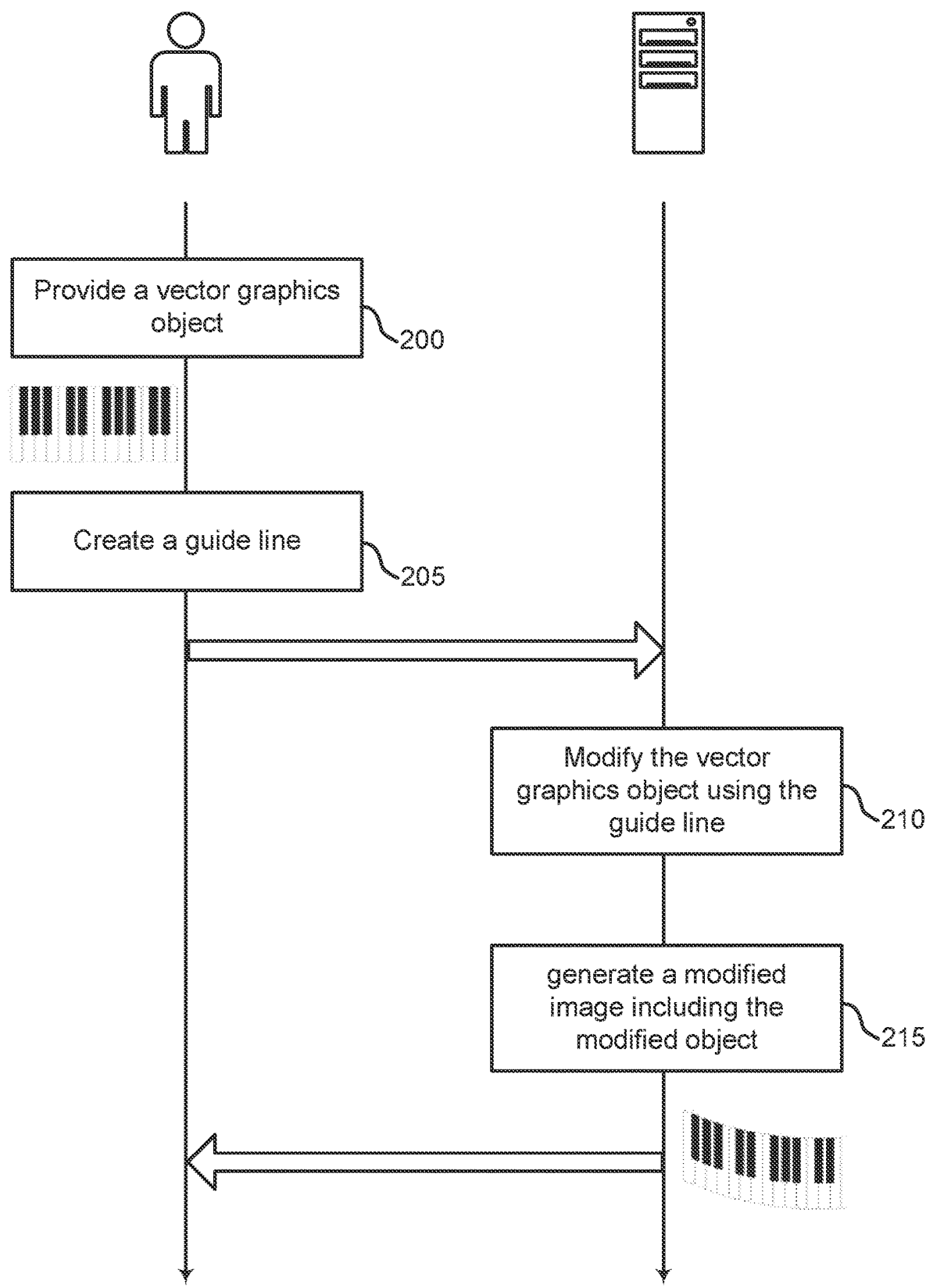
FIG. 2 shows an example of a process for object editing according to aspects of the present disclosure.

FIG. 2 shows an example of a process for object editing according to aspects of the present disclosure. In some examples, these operations are performed by a system including a processor executing a set of codes to control functional elements of an apparatus. Additionally or alternatively, certain processes are performed using special-purpose hardware. For example, the system may include a vector graphics apparatus as described in FIG. 1. Generally, these operations are performed according to the methods and processes described in accordance with aspects of the present disclosure. In some cases, the operations described herein are composed of various substeps, or are performed in conjunction with other operations.

At operation 200, the user provides a vector graphics object. In some cases, the operations of this step refer to, or may be performed by, a user as described with reference to FIG. 1. A vector graphics object refers to computer graphics objects that are defined in terms of points (e.g., points on a Cartesian plane). The points can be connected by lines and curves to form polygons and other shapes. In some applications, vector graphics can be scaled up or down without aliasing. The points in the vector graphics object can be used to determine the direction of vector paths and curves, and each path can have various properties including stroke color, shape, curve, thickness, and fill.

As illustrated in FIG. 2, an image of piano with chords can be viewed as a composite vector graphics object. In some examples, the piano with chords can be viewed as a set of vector graphics objects where each chord is identified as an object.

At operation 205, a user creates a guide line. In some cases, the operations of this step refer to, or may be performed by, a user as described with reference to FIG. 1. In one example, the guide line is a straight line adjacent to a vector graphics object or a portion thereof. In some cases, the guide line is also referred to as a magnetic guide.

At operation 210, the system modifies the vector graphics object using the guide line. In some cases, the operations of this step refer to, or may be performed by, a vector graphics apparatus as described with reference to FIGS. 1 and 5.

For example, the system can jointly edit Bezier segments of multiple vector objects. Joint editing maintains visual constraints and coherence across the segments of different vector objects. In some examples, a user (e.g., designer) can edit the geometry of multiple objects (e.g., chords of the piano) while maintaining visual relationship or coherence across objects based on the guide line. In some examples, the guide line is modified to obtain a guide shape (e.g., a curve).

At operation 215, the system generates a modified image including the modified object. In some cases, the operations of this step refer to, or may be performed by, a vector graphics apparatus as described with reference to FIGS. 1 and 5. For example, the bottom of chords of a piano may be moved to form a curvature while following a visual coherence. The piano is an example of multiple objects that are modified jointly to form a coherent and smooth curve.

Figure 3:
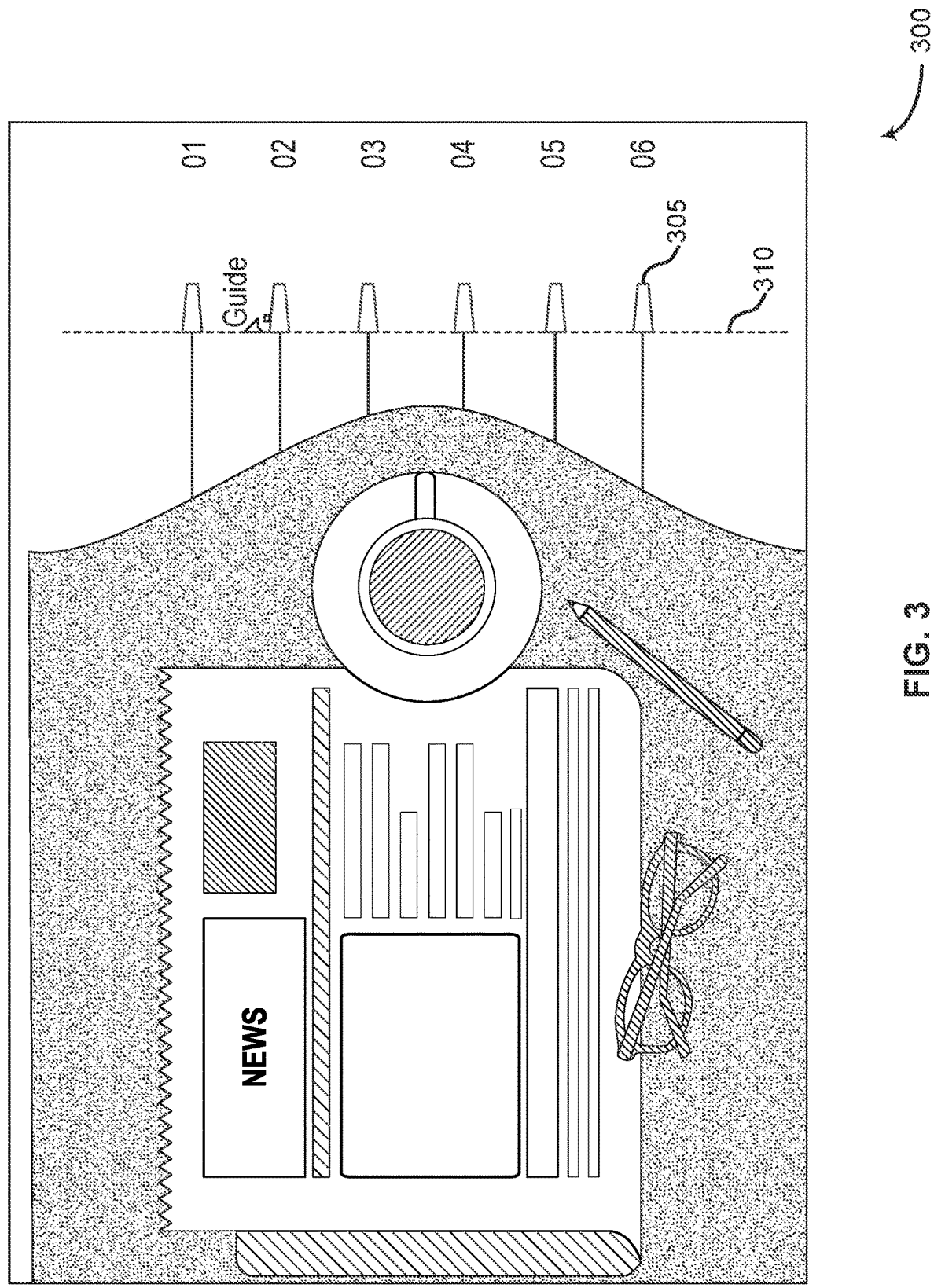
FIG. 3 shows an example of a vector graphics object with a guide line according to aspects of the present disclosure.

FIG. 3 shows an example of a vector graphics object with a guide line according to aspects of the present disclosure. The example shown includes user interface 300, vector graphics objects 305, and guide line 310.

One or more embodiments of the present disclosure can edit Bezier segments of multiple vector graphics objects 305 simultaneously maintaining visual constraints and coherence across the segments of different vector graphics objects 305.

In some embodiments, the vector graphics apparatus is configured to jointly edit Bezier segments of multiple vector graphics objects 305 in multiple dimensions. Methods of joint editing maintains visual constraints and coherence across the segments of different vector objects. In some examples, a user (e.g., designer) can edit the geometry of multiple objects using the user interface 300 while maintaining visual relationship or coherence across objects based on a magnetic guide (e.g., a guide line 310). Guide line 310 is an example of, or includes aspects of, the corresponding element described with reference to FIGS. 9 to 11, and 14.

Figure 4:
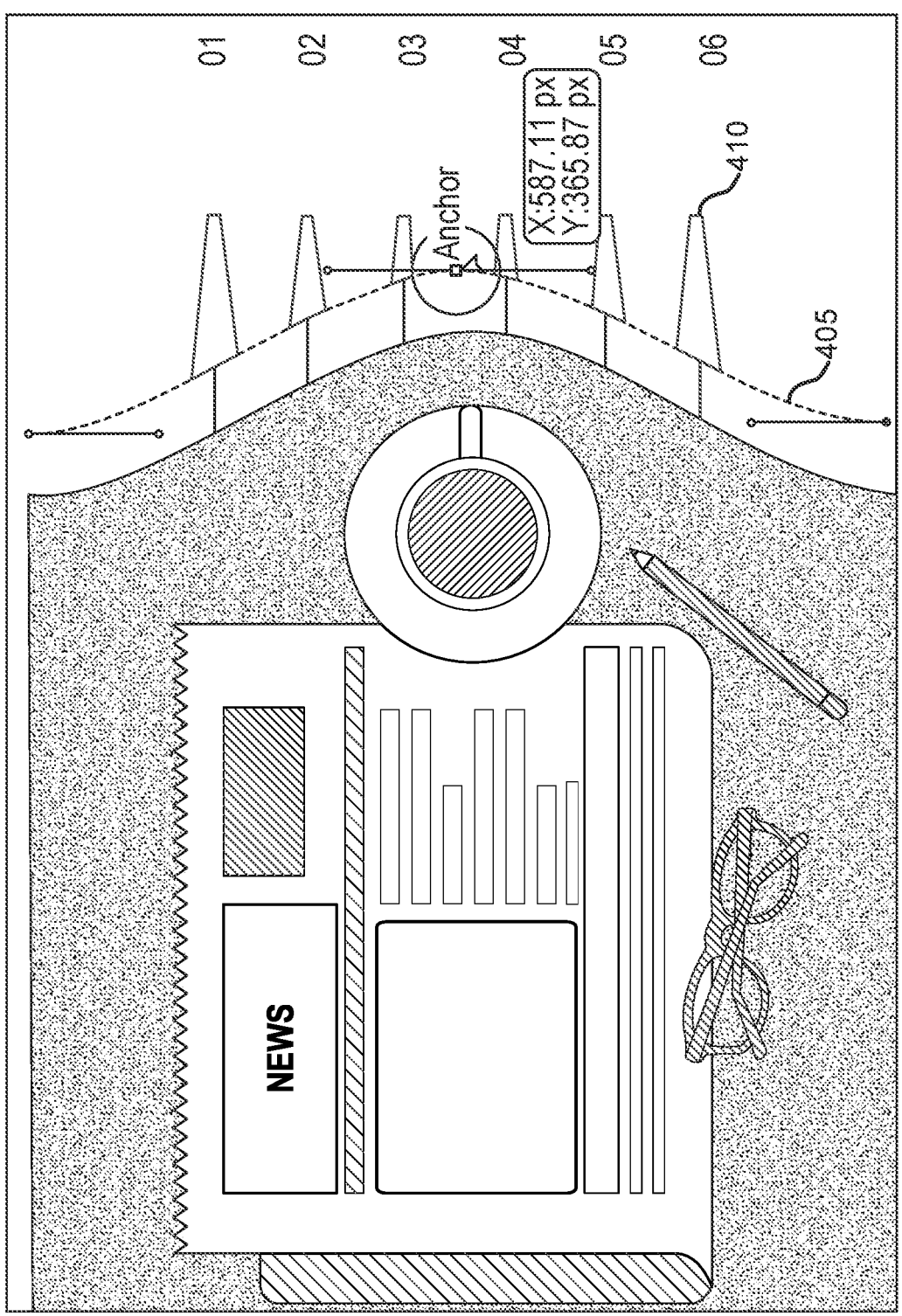
FIG. 4 shows an example of editing multiple objects based on a guide shape according to aspects of the present disclosure.

FIG. 4 shows an example of editing multiple objects based on a guide shape according to aspects of the present disclosure. The example shown includes user interface 400, guide shape 405, and modified vector graphics objects 410.

One or more embodiments of the present disclosure include selection of anchor points of different vector objects by a user. The user can then apply the transformation operation of each of the anchor points jointly for use in multiple dimension.

Embodiments of the present disclosure automatically select anchor points or segments that intersect with a magnetic guide (e.g., a guide line) for editing. The guide line may be modified to obtain a guide shape 405. In some examples, the guide shape 405 is not a straight line, but has a curvy shape. A vector graphics apparatus jointly edits anchor points and partial Bezier segments or Bezier curves. Additionally, a user can edit the position of the attached segments using the user interface 400 while maintaining visual relationship across all the anchor points without touching any anchor point. An example illustrated in FIG. 4 shows that modified vector graphics objects 410 are edited by the user based on guide shape 405 and one or more anchor points. The user can click on an anchor point, move the anchor point around to adjust the guide shape, and accordingly modify shape and/or size of modified vector graphics objects 410. Guide shape 405 is an example of, or includes aspects of, the corresponding element described with reference to FIGS. 14 and 15.

System Architecture

Figure 5:
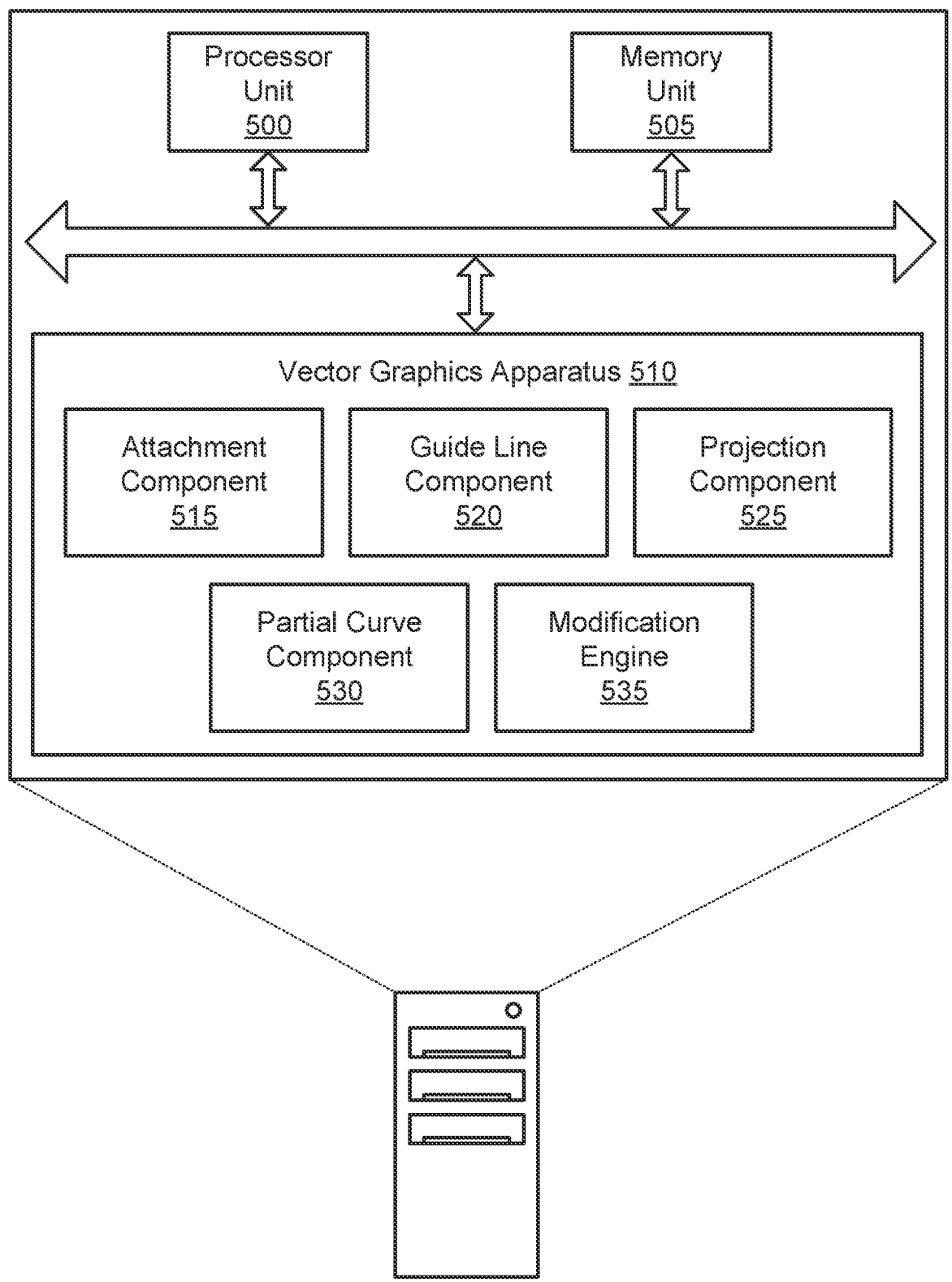
FIG. 5 shows an example of an image processing system according to aspects of the present disclosure.
Figure 6:
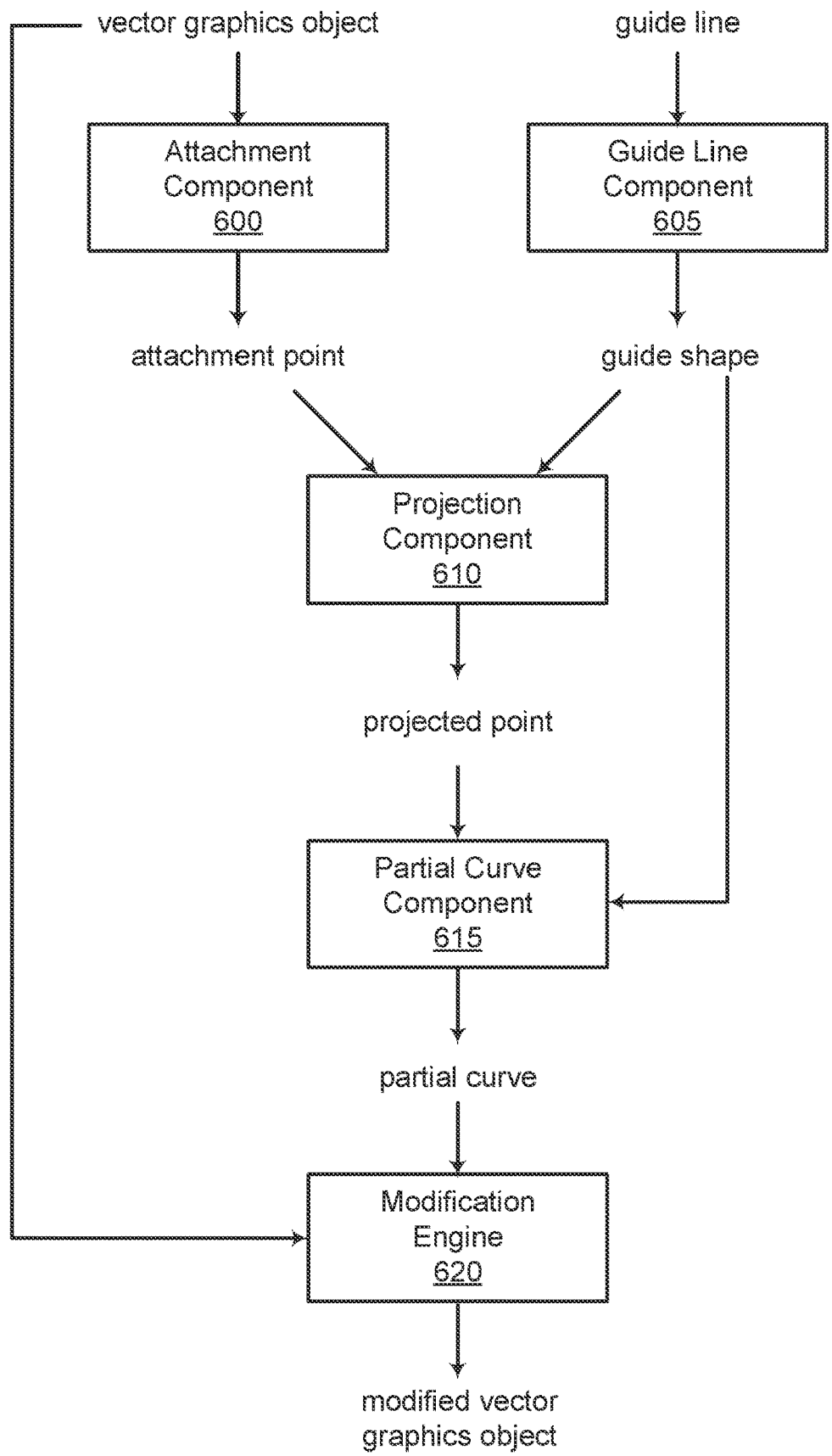
FIG. 6 shows an example of an image processing diagram according to aspects of the present disclosure.

In FIGS. 5-6, an apparatus and method for image processing are described. One or more embodiments of the apparatus and method include an attachment component configured to compare a vector graphics object with a guide line to obtain an attachment point of the vector graphics object; a guide line component configured to modify the guide line to obtain a guide shape; a projection component configured to extend the attachment point to obtain a projected point on the guide shape; a partial curve component configured to divide the guide shape based on the projected point to obtain a partial curve; and a modification engine configured to modify the vector graphics object based on the partial curve to obtain a modified vector graphics object.

In some embodiments, the attachment component is configured to determine that a segment of the vector graphics object is parallel to the guide line, determine that an anchor point of the vector graphics object on the segment is within a threshold distance of the guide line, and generate the attachment point at the anchor point of the vector graphics object.

In some embodiments, the guide line component is configured to move an anchor point of the guide line, wherein the guide line is adjusted based on the movement of the anchor point.

In some embodiments, the projection component is configured to identify an immediately previous point relative to the attachment point on the vector graphics object, identify a previous segment of the vector graphics object based on the immediately previous point, extend the previous segment to intersect with the guide shape, and identify the projected point at an intersection of the previous segment and the guide shape.

In some embodiments, the projection component is configured to identify an immediately next point relative to an additional attachment point on the vector graphics object, identify a next segment of the vector graphics object based on the immediately next point, extend the next segment to intersect with the guide shape, and identify an additional projected point at an intersection of the next segment and the guide shape.

In some embodiments, the partial curve component is configured to identify a first curve that overlaps a length of the guide shape and has an end point at the projected point.

In some embodiments, the modification engine is configured to remove a segment of the vector graphics object that overlaps the attachment point, and include the partial curve in the modified vector graphics object.

In some embodiments, the modification engine is configured to modify a plurality of vector graphics objects simultaneously based on the guide shape to obtain a plurality of modified vector graphics objects corresponding to the plurality of vector graphics objects.

FIG. 5 shows an example of an image processing system according to aspects of the present disclosure. The example shown includes processor unit 500, memory unit 505, vector graphics apparatus 510. In some embodiments, vector graphics apparatus 510 includes attachment component 515, guide line component 520, projection component 525, partial curve component 530, and modification engine 535. Vector graphics apparatus 510 is an example of, or includes aspects of, the corresponding element described with reference to FIG. 1.

A processor unit 500 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 500 is configured to operate a memory array using a memory controller. In other cases, a memory controller is integrated into the processor. In some cases, the processor unit 500 is configured to execute computer-readable instructions stored in a memory to perform various functions. In some embodiments, a processor unit 500 includes special purpose components for modem processing, baseband processing, digital signal processing, or transmission processing.

Examples of a memory unit 505 include random access memory (RAM), read-only memory (ROM), or a hard disk. Examples of memory unit 505 include solid state memory and a hard disk drive. In some examples, a memory unit 505 is used to store computer-readable, computer-executable software including instructions that, when executed, cause a processor to perform various functions described herein. In some cases, the memory unit 505 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 505 store information in the form of a logical state.

According to some embodiments, attachment component 515 compares a vector graphics object with a guide line to obtain an attachment point of the vector graphics object. In some examples, attachment component 515 inserts the guide line parallel to a segment of the vector graphics object. Attachment component 515 then associates the guide line with the segment, where the vector graphics object is compared to the guide line based on the association. In some examples, attachment component 515 associates the guide line with a set of vector graphics objects. In some examples, attachment component 515 determines that a segment of the vector graphics object is parallel to the guide line. Attachment component 515 determines that an anchor point of the vector graphics object on the segment is within a threshold distance of the guide line. Attachment component 515 then generates the attachment point at the anchor point of the vector graphics object. In some examples, the guide line includes a straight line. Attachment component 515 is an example of, or includes aspects of, the corresponding element described with reference to FIG. 6.

According to some embodiments, guide line component 520 modifies the guide line to obtain a guide shape. In some examples, guide line component 520 moves an anchor point of the guide line, where the guide line is adjusted based on the movement of the anchor point. In some examples, the guide shape is a parametric Bezier curve. Guide line component 520 is an example of, or includes aspects of, the corresponding element described with reference to FIG. 6.

According to some embodiments, projection component 525 extends a line through the attachment point to obtain a projected point on the guide shape. In some examples, projection component 525 identifies an immediately previous point relative to the attachment point on the vector graphics object. Projection component 525 identifies a previous segment of the vector graphics object based on the immediately previous point. Projection component 525 extends the previous segment to intersect with the guide shape. Projection component 525 then identifies the projected point at an intersection of the previous segment and the guide shape.

In some examples, projection component 525 identifies an immediately next point relative to an additional attachment point on the vector graphics object. Projection component 525 identifies a next segment of the vector graphics object based on the immediately next point. Projection component 525 extends the next segment to intersect with the guide shape. Projection component 525 then identifies an additional projected point at an intersection of the next segment and the guide shape.

According to some embodiments, projection component 525 is configured to extend the attachment point to obtain a projected point on the guide shape. Projection component 525 is an example of, or includes aspects of, the corresponding element described with reference to FIG. 6.

According to some embodiments, partial curve component 530 divides the guide shape based on the projected point to obtain a partial curve. In some examples, partial curve component 530 identifies a first curve that overlaps a length of the guide shape and has an end point at the projected point. Partial curve component 530 is an example of, or includes aspects of, the corresponding element described with reference to FIG. 6.

According to some embodiments, modification engine 535 modifies the vector graphics object based on the partial curve to obtain a modified vector graphics object. In some examples, modification engine 535 modifies the set of vector graphics objects simultaneously based on the guide shape to obtain a set of modified vector graphics objects corresponding to the set of vector graphics objects. In some examples, modification engine 535 removes a segment of the vector graphics object that overlaps the attachment point. Modification engine 535 then includes the partial curve in the modified vector graphics object. In some examples, modification engine 535 includes the partial curve in the vector graphics object to obtain a modified vector graphics object. Modification engine 535 is an example of, or includes aspects of, the corresponding element described with reference to FIG. 6.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 6 shows an example of an image processing diagram according to aspects of the present disclosure. The example shown includes attachment component 600, guide line component 605, projection component 610, partial curve component 615, and modification engine 620.

According to some embodiments, a vector graphics object is input to attachment component 600, which is configured to compare a vector graphics object with a guide line to obtain an attachment point of the vector graphics object. A guide line is input to guide line component 605, which is configured to modify the guide line to obtain a guide shape. Attachment component 600 is an example of, or includes aspects of, the corresponding element described with reference to FIG. 5. Guide line component 605 is an example of, or includes aspects of, the corresponding element described with reference to FIG. 5.

Next, an attachment point and guide shape are input to projection component 610, which is configured to extend the attachment point to obtain a projected point on the guide shape. Projection component 610 is an example of, or includes aspects of, the corresponding element described with reference to FIG. 5.

Additionally, the projected point is input to partial curve component 615, which is configured to divide the guide shape based on the projected point to obtain a partial curve. Partial curve component 615 is an example of, or includes aspects of, the corresponding element described with reference to FIG. 5.

The partial curve and the vector graphics object are both input to the modification engine 620, which is configured to modify the vector graphics object based on the partial curve to obtain a modified vector graphics object. Modification engine 620 is an example of, or includes aspects of, the corresponding element described with reference to FIG. 5.

Object Modification

In FIGS. 7-17, a method, apparatus, and non-transitory computer readable medium for image processing are described. One or more embodiments of the method, apparatus, and non-transitory computer readable medium include comparing a vector graphics object with a guide line to obtain an attachment point of the vector graphics object; modifying the guide line to obtain a guide shape; extending a line through the attachment point to obtain a projected point on the guide shape; dividing the guide shape based on the projected point to obtain a partial curve; and modifying the vector graphics object based on the partial curve to obtain a modified vector graphics object.

A method, apparatus, and non-transitory computer readable medium for image processing are described. One or more embodiments of the method, apparatus, and non-transitory computer readable medium include comparing a vector graphics object with a guide line to obtain an attachment point of the vector graphics object; modifying the guide line to obtain a guide shape; identifying an immediately previous point relative to the attachment point on the vector graphics object; identifying a previous segment of the vector graphics object based on the immediately previous point; extending the previous segment to obtain a projected point that intersects with the guide shape; dividing the guide shape based on the projected point to obtain a partial curve; removing a segment of the vector graphics object that overlaps the attachment point; and including the partial curve in the vector graphics object to obtain a modified vector graphics object.

Some examples of the method, apparatus, and non-transitory computer readable medium further include inserting the guide line parallel to a segment of the vector graphics object. Some examples further include associating the guide line with the segment, wherein the vector graphics object is compared to the guide line based on the association.

Some examples of the method, apparatus, and non-transitory computer readable medium further include associating the guide line with a plurality of vector graphics objects. Some examples further include modifying the plurality of vector graphics objects simultaneously based on the guide shape to obtain a plurality of modified vector graphics objects corresponding to the plurality of vector graphics objects.

Some examples of the method, apparatus, and non-transitory computer readable medium further include determining that a segment of the vector graphics object is parallel to the guide line. Some examples further include determining that an anchor point of the vector graphics object on the segment is within a threshold distance of the guide line. Some examples further include generating the attachment point at the anchor point of the vector graphics object.

Some examples of the method, apparatus, and non-transitory computer readable medium further include moving an anchor point of the guide line, wherein the guide line is adjusted based on the movement of the anchor point.

Some examples of the method, apparatus, and non-transitory computer readable medium further include identifying an immediately previous point relative to the attachment point on the vector graphics object. Some examples further include identifying a previous segment of the vector graphics object based on the immediately previous point. Some examples further include extending the previous segment to intersect with the guide shape. Some examples further include identifying the projected point at an intersection of the previous segment and the guide shape.

Some examples of the method, apparatus, and non-transitory computer readable medium further include identifying an immediately next point relative to an additional attachment point on the vector graphics object. Some examples further include identifying a next segment of the vector graphics object based on the immediately next point. Some examples further include extending the next segment to intersect with the guide shape. Some examples further include identifying an additional projected point at an intersection of the next segment and the guide shape.

Some examples of the method, apparatus, and non-transitory computer readable medium further include identifying a first curve that overlaps a length of the guide shape and has an end point at the projected point.

Some examples of the method, apparatus, and non-transitory computer readable medium further include removing a segment of the vector graphics object that overlaps the attachment point. Some examples further include including the partial curve in the modified vector graphics object. In some embodiments, the guide line comprises a straight line. The guide shape is a parametric Bezier curve.

Figure 7:
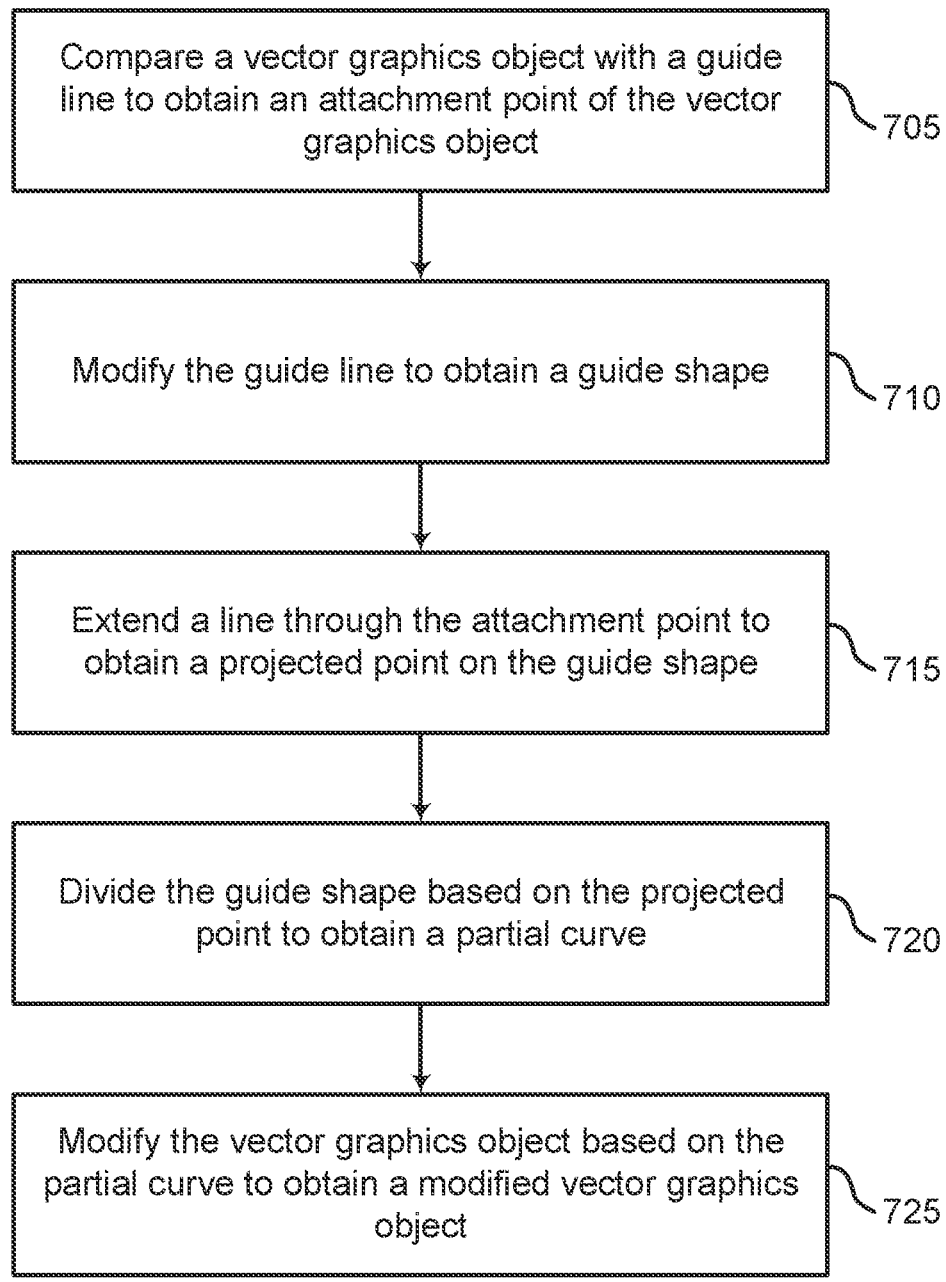
FIG. 7 shows an example of a process for vector graphics object modification according to aspects of the present disclosure.

FIG. 7 shows an example of a process for vector graphics object modification according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system compares a vector graphics object with a guide line to obtain an attachment point of the vector graphics object. In some cases, the operations of this step refer to, or may be performed by, an attachment component as described with reference to FIGS. 5 and 6. In some cases, the system compares a set of substantially similar or different vector graphics objects with a same guide line. For each vector graphics object, the system may obtain more than one attachment points using a vector graphics apparatus. In some examples, users do not explicitly select the Bezier anchor points, different objects or control points for editing. The desired objects can be attached with one or more guide lines implicitly. The attachment with guide lines works well with partial Bezier segments without any selection of the partial segments. According to an embodiment, the attachment is established automatically with the contact of guides and partial segments.

At operation 710, the system modifies the guide line to obtain a guide shape. In some cases, the operations of this step refer to, or may be performed by, a guide line component as described with reference to FIGS. 5 and 6. In some examples, the guide shape is a curve.

At operation 715, the system extends a line through the attachment point to obtain a projected point on the guide shape. In some cases, the operations of this step refer to, or may be performed by, a projection component as described with reference to FIGS. 5 and 6. A projected point is at the intersection of the extended line and the guide shape. In an embodiment, the system extends an additional line through an additional attachment point to obtain an additional projected point on the guide shape.

At operation 720, the system divides the guide shape based on the projected point to obtain a partial curve. In some cases, the operations of this step refer to, or may be performed by, a partial curve component as described with reference to FIGS. 5 and 6. In some examples, visual coherence can be achieved using magnetic guides which internally transmit the coherence to the linked segments or partial segments. The system (e.g., via a vector graphics apparatus) is configured to smoothly edit partial Bezier segments of different vector objects.

At operation 725, the system modifies the vector graphics object based on the partial curve to obtain a modified vector graphics object. In some cases, the operations of this step refer to, or may be performed by, a modification engine as described with reference to FIGS. 5 and 6. According to an embodiment, the system can simultaneously edit multiple vector graphics objects while maintaining visual constraints and/or coherence. For example, simultaneous editing along a curvature enables a coherent appearance of a set of modified vector graphics objects.

Figure 8:
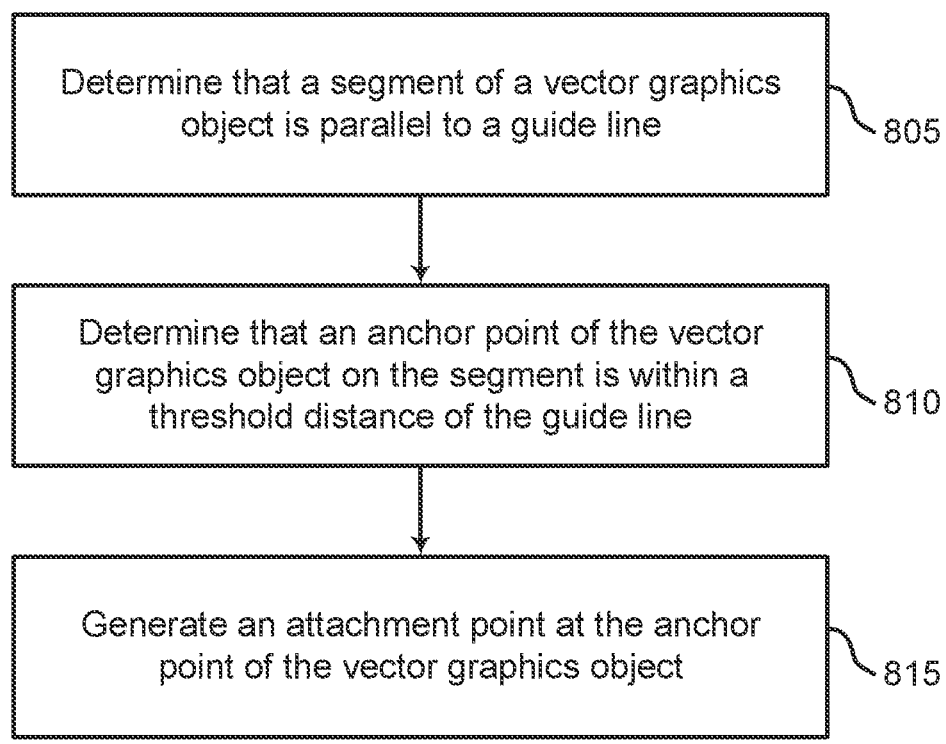
FIG. 8 shows an example of a process for generating an attachment point at an anchor point of a vector graphics object according to aspects of the present disclosure.

FIG. 8 shows an example of a process for generating an attachment point at an anchor point of a vector graphics object according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system determines that a segment of a vector graphics object is parallel to a guide line. In some cases, the operations of this step refer to, or may be performed by, an attachment component as described with reference to FIGS. 5 and 6.

At operation 810, the system determines that an anchor point of the vector graphics object on the segment is within a threshold distance of the guide line. In some cases, the operations of this step refer to, or may be performed by, an attachment component as described with reference to FIGS. 5 and 6. According to an embodiment, the system is configured to locate a nearest point on the guide line which corresponds to an object anchor point. The system then calculates a distance between the nearest point on the guide line and the object anchor point.

At operation 815, the system generates an attachment point at the anchor point of the vector graphics object. In some cases, the operations of this step refer to, or may be performed by, an attachment component as described with reference to FIGS. 5 and 6. The attachment point is located at a same location as the anchor point of the vector graphics object.

FIG. 9 shows an example of a vector graphics object, a guide line, and anchor points according to aspects of the present disclosure. The example shown includes vector graphics object 900, guide line 905, and anchor point 910. In some examples, notations herein are used throughout the specification. An art object represents each object including a path object, a text object, an image object, etc. which are used or consumed in a vector graphics software application. Each object may be represented using a unique identifier $o_i$. The data structure of each art object is extended to store a list of magnetic guides with which it has been attached ($\Omega$).

Guides are basic tools in a design application used for alignment and precise positioning. In some cases, the capability of guides may be extended to a magnetic guide (G or M). M is also used interchangeably to denote magnetic guides. In some embodiments, a magnetic guide is a guide line that is straight and is used to define attachment points for one or more vector objects.

As an example illustrated in FIG. 9, vector graphics object 900 includes six object anchor points 910. A guide line 905 includes three guide anchor points 910. However, vector graphics object 900 may include more than six or less than six anchor points while guide line 905 may include more than three or less than three guide anchor points. In an embodiment, object segment ordering includes assigning a segment number with each segment of vector graphics object 900 (e.g., Segment 1, 2, 3, 4, 5, 6). Each segment refers to a line segment defined by two of the object anchor points. Vector graphics object 900 is an example of, or includes aspects of, the corresponding element described with reference to FIGS. 10, 11, 14, and 16. Guide line 905 is an example of, or includes aspects of, the corresponding element described with reference to FIGS. 3, 10, 11, and 14.

FIG. 10 shows an example of a process for determining a segment of an object is parallel to a guide line according to aspects of the present disclosure. The example shown includes vector graphics object 1000, guide line 1005, anchor point 1010, and segment 1015.

As an example illustrated in FIG. 10, vector graphics object 1000 includes six object anchor points 1010. A guide line 1005 includes three guide anchor points. However, vector graphics object 1000 may include more than six or less than six anchor points 1010 depending on user configuration or software application setup while guide line 1005 may include more than three or less than three guide anchor points. When attaching guide line 1005 with vector graphics object 1000, the example shows three sticked positions.

Vector graphics object 1000 is an example of, or includes aspects of, the corresponding element described with reference to FIGS. 9, 11, 14, and 16. Guide line 1005 is an example of, or includes aspects of, the corresponding element described with reference to FIGS. 3, 9, 11, and 14.

In some embodiments, a magnetic guide includes a set of art objects id ($o_i$) attached with a guide G represented with ($\Sigma$). Each attached art object ($o_i$) contains the continuous attachment positions (endpoints) in the form of data structure Sticked_Position (S). Sticked_Position includes attachment point coordinates p, an art object's Bezier segment number pSemgentNum corresponding to p, and guide's Bezier segment number gSemgentNum corresponding to p. Additionally, the Sticked_Position includes gSemgentNum's T position gT corresponding to p and a previous prev and next next anchor position corresponding to p of ($o_i$).

In an embodiment, the vector graphics apparatus is configured to evaluate whether or not an object and guide line 1005 partially coincide. The vector graphics apparatus determines that a segment of vector graphics object 1000 is parallel to the guide line and that an anchor point of vector graphics object 1000 on the segment is within a threshold distance of the guide line 1005. As illustrated in the example of FIG. 10, two art segments including segment 1015 fully coincide with the stick guide (i.e., guide line 1005). Additionally, vector graphics object 1000 is attached to guide line 1005. Attachment positions (endpoints) include object anchor points. These attachment positions may also be referred to as the first sticked position and the last sticked position (see bottom of FIG. 10).

In some examples, segment 1015 is a line defined by two endpoints (i.e., object anchor points). Segment 1015 is an example of, or includes aspects of, the corresponding element described with reference to FIG. 11.

FIG. 11 shows an example of a process for generating an attachment point according to aspects of the present disclosure. The example shown includes vector graphics object 1100, guide line 1105, attachment point 1110, and segment 1115.

According to an embodiment, vector graphics object 1100 includes a segment 1115. As an example shown in FIG. 11, segment 1115 is defined by two object anchor points p and p". The vector graphics apparatus is configured to find the nearest point of p on guide line 1105. In some cases, the nearest point is referred to as "nearest TPoint on Stick Guide". If point p lies on the guide line 1105 and not its extension, the vector graphics apparatus creates a Sticked_Position (if not duplicate entry in the vector) and stores the segment number of path as gSemgentNum and its T position T as gT into the Sticked_Position. Additionally, the vector graphics apparatus stores the $s_j$ number as pSemgentNum. The vector graphics apparatus stores the prev and the next path segment points of p of $o_i$ in Sticked_Position cache. A variable Sticked_Positions is created to store the list of adjacent coincident segment's sticked_Positions in a vector.

In the example illustrated in FIG. 11, Sticked_Position includes the following data such as point=p, pSemgentNum=2, pSemgentNum=1, gT=gT of S, prev=p', next=p". In some examples, attachment point 1110 is point p. pSemgentNum 1 is a guide Bezier number. pSemgentNum 2 is a path Bezier number. Point p' is a previous point (i.e., Stick Position's previous anchor of art. Point p" is a next point (i.e., Stick Position's next anchor of art).

Vector graphics object 1100 is an example of, or includes aspects of, the corresponding element described with reference to FIGS. 9, 10, 14, and 16. Guide line 1105 is an example of, or includes aspects of, the corresponding element described with reference to FIGS. 3, 9, 10, and 14. Segment 1115 is an example of, or includes aspects of, the corresponding element described with reference to FIG. 10.

Figure 12:
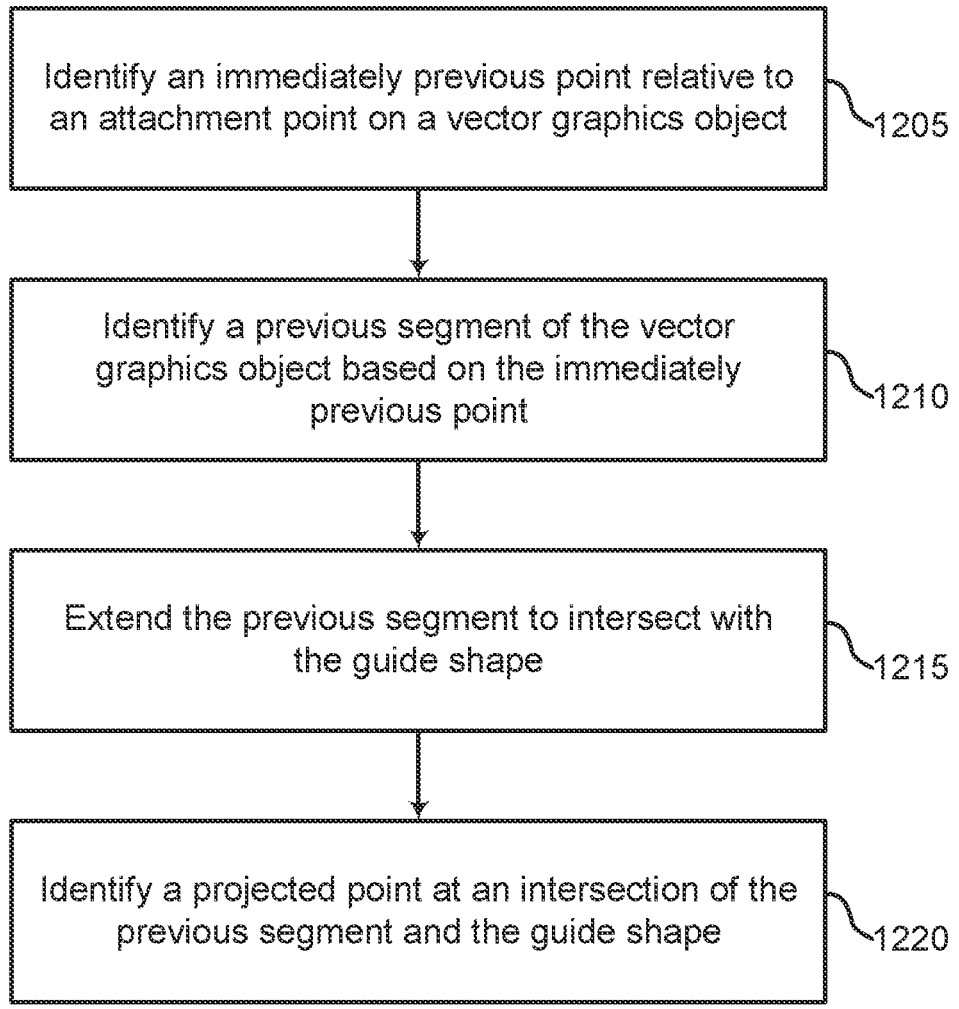
FIG. 12 shows an example of a process for identifying a projected point according to aspects of the present disclosure.

FIG. 12 shows an example of a process for identifying a projected point according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies an immediately previous point relative to an attachment point on a vector graphics object. In some cases, the operations of this step refer to, or may be performed by, a projection component as described with reference to FIGS. 5 and 6.

Figure 14:
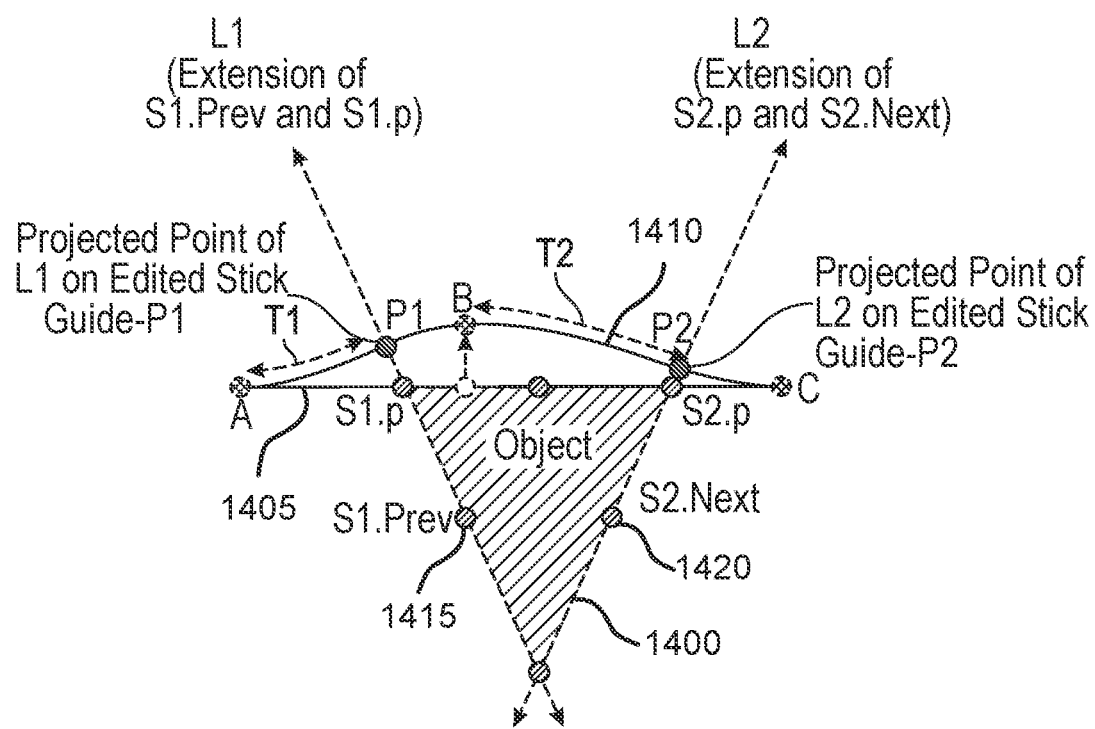
FIG. 14 shows an example of a process for extending a line through an attachment point according to aspects of the present disclosure.

In some examples, referring to an example in FIG. 14, the attachment point is S1.p, which is also an anchor point of a vector graphics object. The system identifies an immediately previous point S1.prev.

At operation 1210, the system identifies a previous segment of the vector graphics object based on the immediately previous point. In some cases, the operations of this step refer to, or may be performed by, a projection component as described with reference to FIGS. 5 and 6.

In some examples, referring to the example in FIG. 14, a previous segment includes a Bezier between points S1.prev and S1.p. The previous segment is defined by the two endpoints S1.prev and S1.p.

At operation 1215, the system extends the previous segment to intersect with the guide shape. In some cases, the operations of this step refer to, or may be performed by, a projection component as described with reference to FIGS. 5 and 6.

In some examples, referring to the example in FIG. 14, vector graphics apparatus can extend the previous segment (S1.prev and S1.p) to intersect with the guide shape. In some cases, the guide shape is a curve.

At operation 1220, the system identifies a projected point at an intersection of the previous segment and the guide shape. In some cases, the operations of this step refer to, or may be performed by, a projection component as described with reference to FIGS. 5 and 6.

In some examples, referring to the example in FIG. 14, the projected point is point P1. The projected point P1 is at the intersection of the extended line (L1) and the guide shape (represented by ABC). The projected point P1 also divides the guide shape into two partial curves (curve AP1 and curve P1BC).

Figure 13:
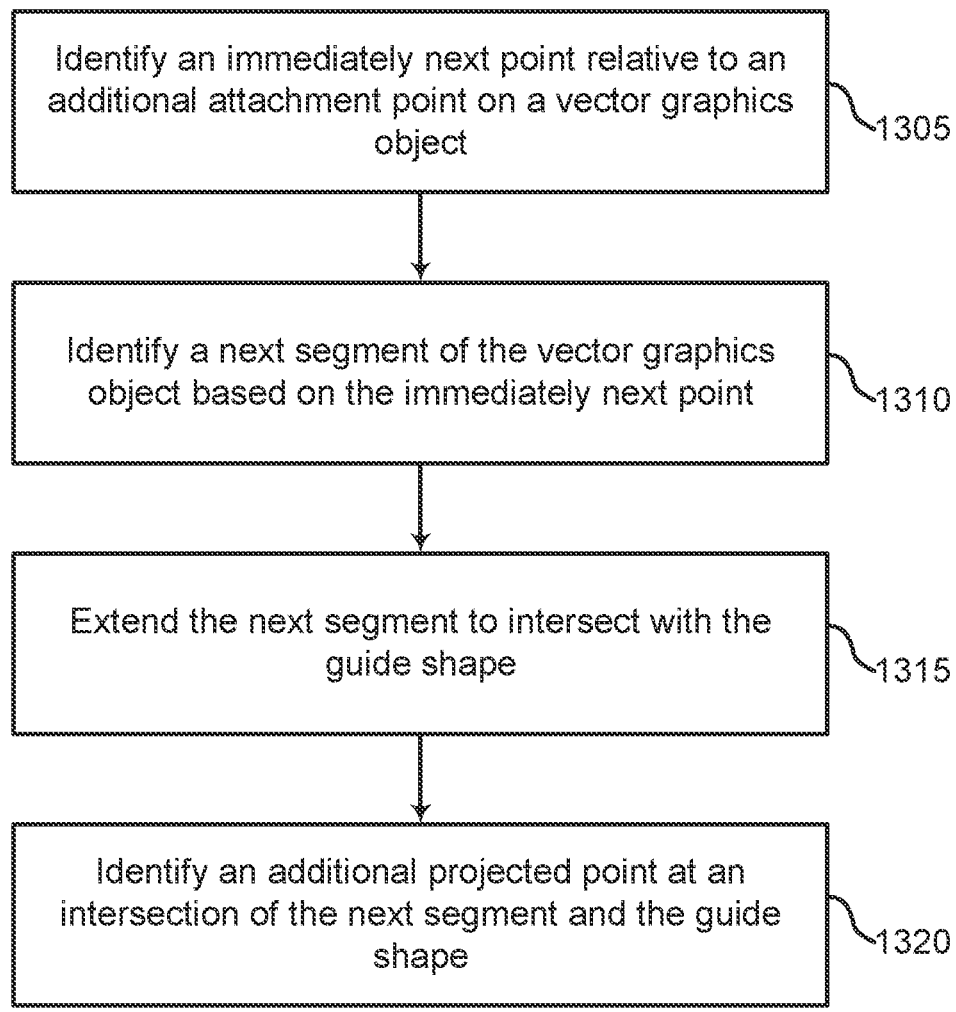
FIG. 13 shows an example of a process for identifying an additional projected point according to aspects of the present disclosure.

FIG. 13 shows an example of a process for identifying an additional projected point according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system identifies an immediately next point relative to an additional attachment point on a vector graphics object. In some cases, the operations of this step refer to, or may be performed by, a projection component as described with reference to FIGS. 5 and 6.

In some examples, referring to an example in FIG. 14, the additional attachment point is S2.p, which is also an anchor point of the vector graphics object. The system identifies an immediately next point S2.next.

At operation 1310, the system identifies a next segment of the vector graphics object based on the immediately next point. In some cases, the operations of this step refer to, or may be performed by, a projection component as described with reference to FIGS. 5 and 6.

In some examples, referring to the example in FIG. 14, a next segment includes a Bezier between points S2.next and S2.p. The next segment is a line defined by the two points S2.next and S2.p.

At operation 1315, the system extends the next segment to intersect with the guide shape. In some cases, the operations of this step refer to, or may be performed by, a projection component as described with reference to FIGS. 5 and 6.

In some examples, referring to the example in FIG. 14, vector graphics apparatus can extend the next segment (S2.next and S2.p) to intersect with the guide shape. In some cases, the guide shape is a curve.

At operation 1320, the system identifies an additional projected point at an intersection of the next segment and the guide shape. In some cases, the operations of this step refer to, or may be performed by, a projection component as described with reference to FIGS. 5 and 6. In some examples, referring to the example in FIG. 14, the projected point is point P2. The projected point P2 is at the intersection of the extended line (L2) and the guide shape (represented by ABC). The projected point P2 also divides the guide shape into two partial curves.

FIG. 14 shows an example of a process for extending a line through an attachment point according to aspects of the present disclosure. The example shown includes vector graphics object 1400, guide line 1405, guide shape 1410, immediately previous point 1415, and immediately next point 1420.

As an example illustrated in FIG. 14, immediately previous point 1415 is S1.prev. Immediately next point 1420 is S1. next. In an embodiment, guide line 1405 is initially a straight line. Guide line 1405 is then modified to obtain a guide shape 1410. Guide line 1405 includes a straight line between points A and C. Guide shape 1410 includes the curve denoted by ABC or a combination of partial curves (e.g., AB and BC).

According to an embodiment, the vector graphics apparatus is configured to obtain a Bezier between points S1.prev and S1.p. The result is stored in Bezier B1. The vector graphics apparatus obtains a Bezier between points S2.p and S2.next. The result is stored in a variable Bezier B2. The vector graphics apparatus can locate the intersection position, (guide) segment number and (guide segment) T position of extended B1 and B2 with the edited guide (i.e., guide shape 1410). For example, a previous segment line is defined between points S1.prev and S1.p. The vector graphics apparatus extends the previous segment line to intersect with the guide shape 1410. P1 is the projected point at the intersection of the extended previous segment and the guide shape 1410. Additionally, a next segment line is defined between points S2.p and S2.next. The vector graphics apparatus extends the next segment line to intersect with the guide shape 1410. P2 is the projected point at the intersection of the extended next segment and the guide shape 1410.

Vector graphics object 1400 is an example of, or includes aspects of, the corresponding element described with reference to FIGS. 9-11, and 16. Guide line 1405 is an example of, or includes aspects of, the corresponding element described with reference to FIGS. 3, and 9-11. Guide shape 1410 is an example of, or includes aspects of, the corresponding element described with reference to FIGS. 4 and 15.

Figure 15:
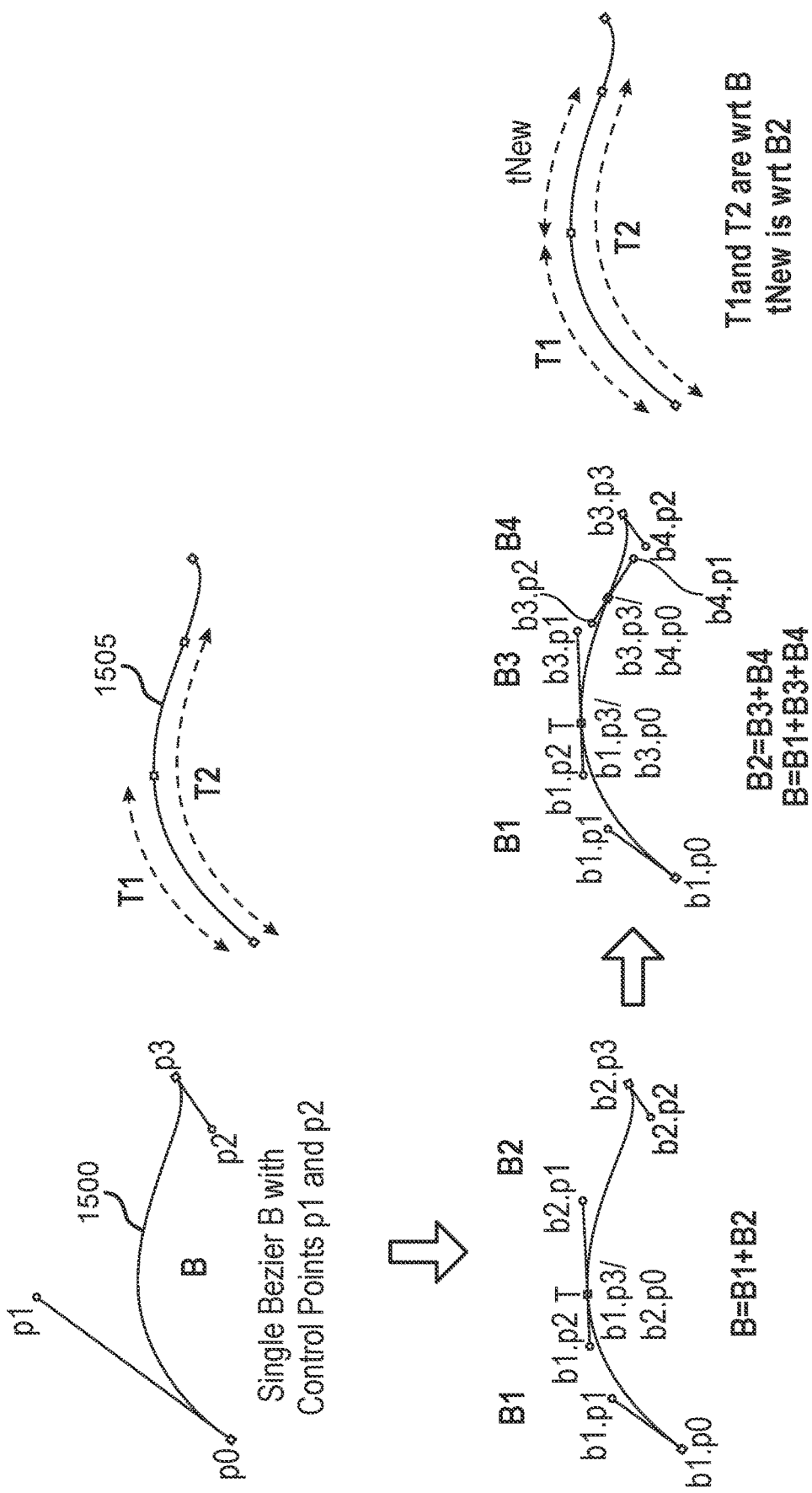
FIG. 15 shows an example of a process for dividing a guide shape based on a projected point to obtain a partial curve according to aspects of the present disclosure.

FIG. 15 shows an example of a process for dividing a guide shape based on a projected point to obtain a partial curve according to aspects of the present disclosure. The example shown includes guide shape 1500 and partial curve 1505.

One or more embodiments of the present disclosure retrieve the edited magnetic guide's single segment data in the form of a data structure EditedGuideSeg (EGS) as the magnetic guide goes through edit transformation by a user. EditedGuideSeg includes a path segment seg with in, p and out positions and two control positions (i.e., prevSegOut and nextSegIn) with data of control positions. In some cases, the data structure EditedGuideSeg is also referred to as Edited_Segment.

$$\text{Struct Edited\_Segment(Seg(pIn,p,pOut),} $$

$$\text{PrevBezOut,NextBezIn)} \tag{1}$$

As an example illustrated in in FIG. 15, a single Bezier B includes two control points p1 and p2. A Bezier is represented as p0, p1, p2, p3. p0 and p3 are the p positions. Additionally, p1 is defined as out position of p0 and p2 is defined as in position of p3. Next, single Bezier B may be divided into two Beziers B1 and B2 by diving it at t-value T, which results in change in the control point position of p1 and p2. Accordingly, data structure Edited_Segment at T of B is defined as follows, $$Seg(pIn = b1 \cdot p2, \tag{2}$$
$$p = b1 \cdot p3 \text{ or } b2 \cdot p1 (\text{both are same}), pOut = b2 \cdot p1)$$
$$PrevBezOut = b1 \cdot p1, NextBezIn = b2 \cdot p2)$$

Furthermore, B2 may be divided into two Beziers B3 and B4 dividing it at tNew value T, which results in change in the control point position. For example, B2=B3+B4 and B=B1+B3+B4. Accordingly, data structure Edited_Segment at T1 of B is defined as follows, $$Seg(pIn = b1 \cdot p2, \tag{3}$$
$$p = b1 \cdot p3 \text{ or } b3 \cdot p0 (\text{both are same}), pOut = b3 \cdot p1)$$
$$PrevBezOut = b1 \cdot p1, NextBezIn = b3 \cdot p2)$$

Data structure Edited_Segment at T2 of B is defined as follows, $$Seg(pIn = b3 \cdot p2, \tag{4}$$
$$p = b3 \cdot p3 \text{ or } b4 \cdot p0 (\text{both are same}), pOut = b4 \cdot p1)$$
$$PrevBezOut = b3 \cdot p1, NextBezIn = b4 \cdot p2)$$

Guide shape 1500 is an example of, or includes aspects of, the corresponding element described with reference to FIGS. 4 and 14.

Figure 16:
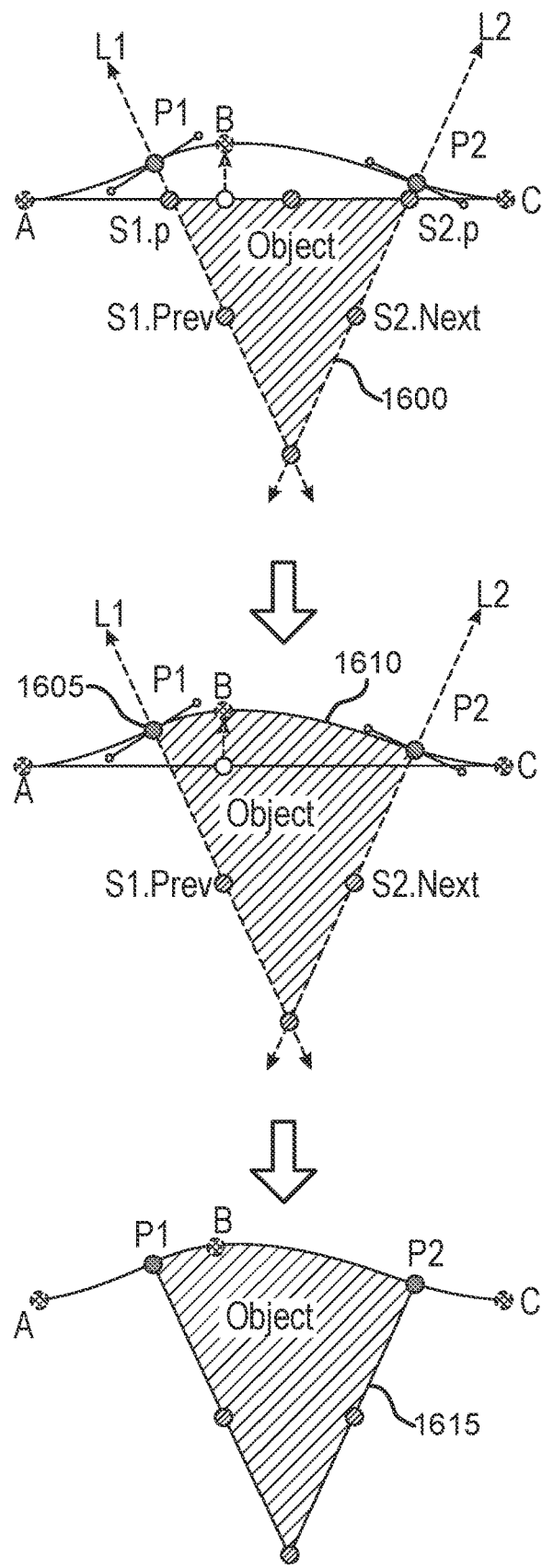
FIGS. 16 and 17 show examples of a process for modifying a vector graphics object based on a partial curve according to aspects of the present disclosure.

FIG. 16 shows an example of a process for modifying a vector graphics object based on a partial curve according to aspects of the present disclosure. The example shown includes vector graphics object 1600, projected point 1605, partial curve 1610, and modified vector graphics object 1605.

An example in FIG. 16 shows graphical editing of vector Bezier segments. One or more embodiments of the present disclosure can perform simultaneous editing of multiple vector objects to maintain visual constraints. In some cases, coherence across the segments of different vector objects can be achieved using a magnetic guide (e.g., a guide line). For example, magnetic guides can attach to partial segments across the objects and move the set of objects in sync. As a result, the simultaneous editing along a curvature enables a coherent appearance.

In an embodiment, a guide line (i.e., AC, a straight line defined by endpoints A and C) is attached to the vector graphics object 1600. The vector graphics apparatus is configured to compare the vector graphics object 1600 with the guide line AC to obtain an attachment point (i.e., S1.p). The guide line is modified to obtain a guide shape (e.g., defined by curve ABC). The vector graphics apparatus is configured to extend a line through the attachment point to obtain a projected point on the guide shape. For example, the projected point is P1. The vector graphics apparatus divides the guide shape based on the projected point to obtain a partial curve 1610, and modifies the vector graphics object 1600 based on the partial curve 1610 to obtain a modified vector graphics object 1615. Vector graphics object 1600 is an example of, or includes aspects of, the corresponding element described with reference to FIGS. 9 to 11, and 14.

In some examples, the upper part of the vector graphics object 1600 is initially a straight line (defined by S1.p and S2.p) and is modified to form a curvature (see bottom of FIG. 16).

Figure 17:
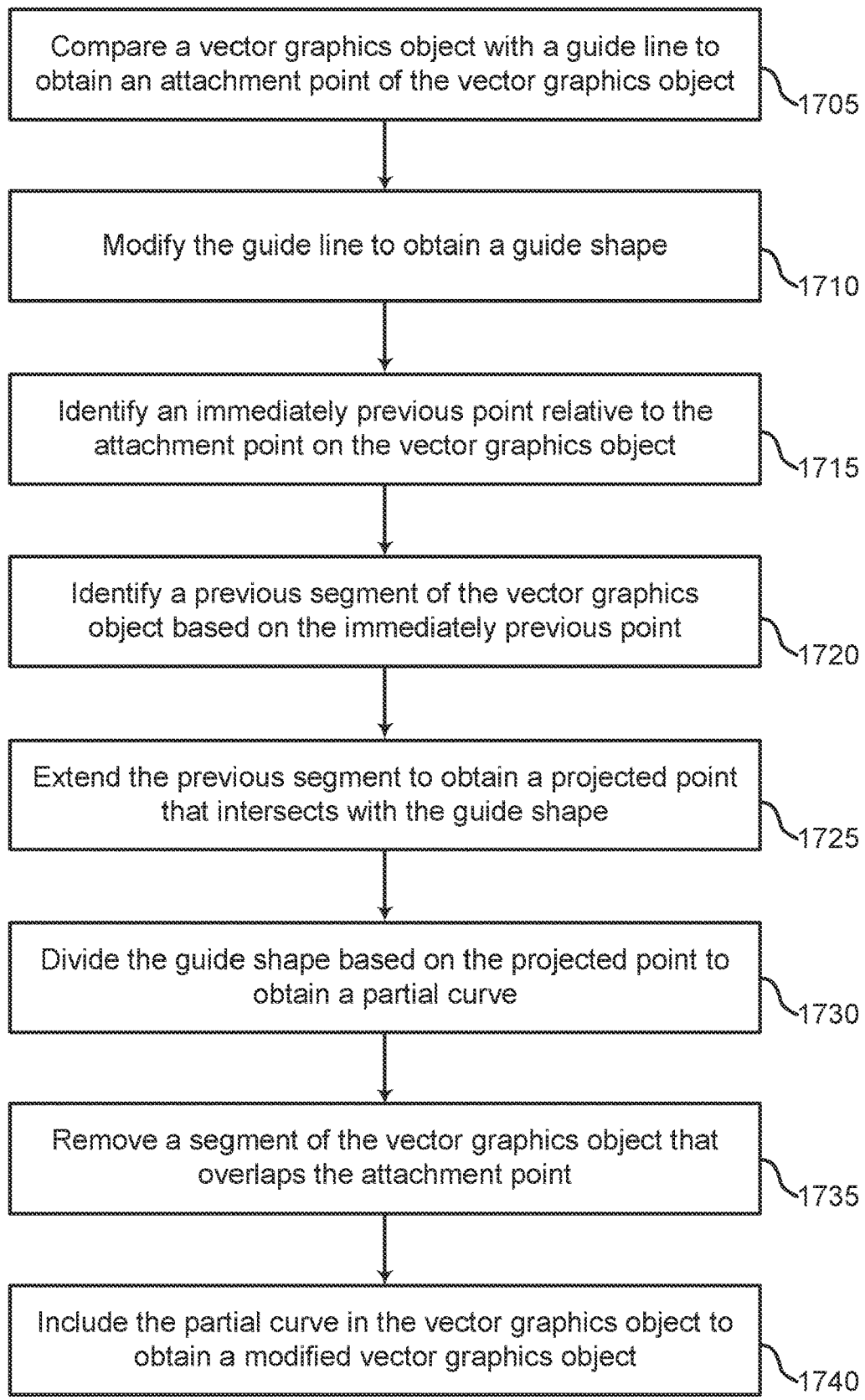

FIG. 17 shows an example of a process for modifying a vector graphics object based on a partial curve according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system compares a vector graphics object with a guide line to obtain an attachment point of the vector graphics object. The attachment point may also be referred to as a sticked position. The vector graphics object includes a set of object anchor points. Additionally, the guide line includes a set of guide anchor points. In an embodiment, the system determines that a segment of the vector graphics object is parallel to the guide line and determines that an anchor point of the vector graphics object on the segment is within a threshold distance of the guide line. The system then generates the attachment point at the anchor point of the vector graphics object based on the determination. In some cases, the operations of this step refer to, or may be performed by, an attachment component as described with reference to FIGS. 5 and 6.

At operation 1710, the system modifies the guide line to obtain a guide shape. The guide line is a straight line. The guide shape is a parametric Bezier curve. In some cases, the operations of this step refer to, or may be performed by, a guide line component as described with reference to FIGS. 5 and 6.

At operation 1715, the system identifies an immediately previous point relative to the attachment point on the vector graphics object. The immediately previous point is also one of the set of anchor points on the vector graphics object. In some cases, the operations of this step refer to, or may be performed by, a projection component as described with reference to FIGS. 5 and 6.

At operation 1720, the system identifies a previous segment of the vector graphics object based on the immediately previous point. For example, the previous segment is represented by two points, i.e., the immediately previous point and an anchor point from the set of anchor points. In some cases, the operations of this step refer to, or may be performed by, a projection component as described with reference to FIGS. 5 and 6.

At operation 1725, the system extends the previous segment to obtain a projected point that intersects with the guide shape. In an embodiment, the system identifies an additional projected point at an intersection of an extended next segment and the guide shape. In some cases, the operations of this step refer to, or may be performed by, a projection component as described with reference to FIGS. 5 and 6.

At operation 1730, the system divides the guide shape based on the projected point to obtain a partial curve. In an embodiment, dividing the guide shape further includes identifying a first curve that overlaps a length of the guide shape and has an end point at the projected point. In some cases, the operations of this step refer to, or may be performed by, a partial curve component as described with reference to FIGS. 5 and 6.

At operation 1735, the system removes a segment of the vector graphics object that overlaps the attachment point. In some cases, the operations of this step refer to, or may be performed by, a modification engine as described with reference to FIGS. 5 and 6.

At operation 1740, the system includes the partial curve in the vector graphics object to obtain a modified vector graphics object. In some cases, the operations of this step refer to, or may be performed by, a modification engine as described with reference to FIGS. 5 and 6.

Object Modification Algorithms

FIG. 18 shows an example of an algorithm for cache creation according to aspects of the present disclosure. As illustrated in FIG. 18, the vector graphics apparatus is configured to attach a set of objects (objects may also be referred to as arts or art objects) to magnetic sticks where partial trajectory of the objects coincides with the sticks. The algorithm 1800 is used for cache creation. At line 2, algorithm 1800 is executed to collect all the objects that intersect with a magnetic guide (G) that is created or transformed. At line 3, for each object that intersects with a magnetic guide, algorithm 1800 will execute lines 4-8. The vector graphics apparatus may fill the sticked positions as attached points if a part of the trajectory of the object $o_i$ coincides with a part of linear stick guide's G trajectory. At line 5, algorithm 1800 is executed to extract the geometry of both guide G and object $o_i$. At line 6, the variable StickedPositions is initially set to empty. StickedPositions may be a data structure or a list. At line 7, algorithm 1800 is executed to call function Do_Partially_Coincide ($o_i$, G, StickedPositions). If function Do_Partially_Coincide returns true, algorithm 1800 moves to line 8. At line 8, algorithm 1800 is executed to store all the StickedPosition within the object $o_i$ itself (since it is a metadata of path attachment point to the attached magnetic guide). In some embodiments, the object is a vector graphics object.

In some embodiments, cache creation phase begins with a single linear straight line as the magnet stick guide (e.g., a guide line). As a result, coincidence of a linear stick with one or more art objects can be checked based on segment collinearity.

FIG. 19 shows an example of an algorithm for determining whether or not a guide line partially coincides with an object according to aspects of the present disclosure. Algorithm 1900 involves a function Do_Partially_Coincide, which is mentioned above in algorithm 1800. Do_Partially_Coincide takes an object $o_i$, magnetic guide G, and StickedPositions as input to the function. At line 2, algorithm 1900 is executed to extract the line equation of the magnetic stick G since it is linear. Algorithm 1900 assigns the extracted line equation to a variable $G_E$. At line 3, for each ($s_j$) segment of $o_i$, execute lines 4-9. At line 4, if $s_j$ is a straight line and collinear with $G_E$, then execute lines 5-9. At line 5, for each (p) end point of $s_j$ segment of $o_i$, algorithm 1900 moves to execute lines 6-8. At line 6, algorithm 1900 is executed to find the nearest point of p on $G_E$. The nearest point is then assigned to a variable nearestTPoint. At line 7, algorithm 1900 is executed to calculate T value of that nearestTPoint. T value is assigned to a variable T. At line 8, algorithm 1900 is executed to calculate a distance between the nearestTPoint and p. At line 9, if T≤1 and D≤pointOverlapDelta, which means point p lies on the magnetic guide G and not its extension, then move to lines 10-12. At line 10, algorithm 1900 is executed to create a StickedPosition (if not duplicate entry in the vector) and store the segment number of path as gSemgentNum and its T position T as gT into the StickedPosition. At line 11, algorithm 1900 stores the $s_j$ number as pSemgentNum. At line 12, algorithm 1900 stores the prev and the next path segment points of p of $o_i$ in StickedPosition cache. At line 13, a variable StickedPositions is created to store the list of adjacent coincident segments' stickedPositions in a vector. At line 14, if StickedPositions is not empty, algorithm 1900 returns true. Otherwise, algorithm 1900 returns false (i.e., line 15).

FIG. 20 shows an example of an algorithm for guide line edit transformation according to aspects of the present disclosure. On edit transformation of the magnetic stick guide (e.g., a guide line), all the attached arts are transformed via special edit transformation as the following. Algorithm 2000 relates to magnetic stick edit transformation. At line 1, the function is referred to as Magnetic_Stick_Edit_Transformation. The function takes $o_i$, G, StickedPositions as input. At line 2, a variable EG is created to store Edited Guide. At line 3, for each ($o_j$) attached to the magnetic guide G in transformation, algorithm 2000 will execute steps 4-24. At line 4, algorithm 2000 is executed to obtain the attached sticked positions cached in $o_i$. The result is stored in StickedPositions. At line 5, a variable S1 is created to store First Sticked Position. At line 6, a variable S2 is created to store Last Sticked Position. At line 7, algorithm 2000 calls function Clockwise_Ordered. If function Clockwise_Ordered (S1, S2) is true, then execute lines 8-9. Otherwise, execute lines 11-12. At line 8, algorithm 2000 is executed to obtain a Bezier between points S1.p and S1. next. The result is stored in a variable Bezier B1. At line 9, algorithm 2000 is executed to obtain a Bezier between points S2.prev and S2.p. The result is stored in a variable Bezier B2. At line 11 (i.e., Clockwise_Ordered (S1, S2) is false), algorithm 2000 obtains Bezier between points S1.prev and S1.p. The result is stored in Bezier B1. At line 12, algorithm 2000 is executed to obtain Bezier between points S2.p and S2.next. The result is stored in a variable Bezier B2. At line 13, algorithm 2000 finds the intersection position, (guide) segment number and (guide segment) T position of extended B1 and B2 with the edited guide in lines 14-15. At line 14, algorithm 2000 calls the function Get_Bezier_Projection_On_Edited_Guide (S1.p, B1, EG). The result is stored in variables T1, Seg1, respectively. At line 15, call the function Get_Bezier_Projection_On_Edited_Guide (S2.p, B2, EG). The result is stored in T2, Seg2, respectively. At line 16, if both Beziers B1 and B2 intersect on distinct segment of EG (i.e., S1!=S2), then algorithm 2000 moves to lines 17-18. At line 17, algorithm 2000 calls the function GET_EDITED_SEGMENT_BEZIER_POINTS (EG, Seg1, T1). The result is stored in a variable EditedGuideSegEGS$_1$. At line 18, algorithm 2000 calls the function GET_EDITED_SEGMENT_BEZIER_POINTS (EG, Seg1, T2). The result is stored in a variable EditedGuideSegEGS$_2$. Otherwise, move on to lines 19-20. At line 20, algorithm 3 calls the function Get_Bezier_Points_Same_Seg (EG, Seg1, T1, T2). The result is stored in EditedGuideSegEGS$_1$, EGS$_2$. At line 21, if a user wants to make edges of end sticked positions sharp (i.e., not smooth), algorithm 2000 will execute lines 22-23. At line 22, EGS$_1$.Seg.in=EGS$_1$.Seg.p. At line 23, EGS$_2$.Seg.out=EGS$_2$.Seg.p. At line 24, algorithm 2000 calls the function EDIT_STICKED_PATHS_REDRAW ($o_i$, EGS$_1$, EGS$_2$).

Figure 21:
FIG. 21 shows an example of an algorithm for clockwise ordering according to aspects of the present disclosure.

FIG. 21 shows an example of an algorithm for clockwise ordering according to aspects of the present disclosure. Algorithm 2100 involves a function ClockWise_Ordered, which is called upon in algorithm 2000 above. ClockWise_Ordered takes StickedPosition1 and StickedPosition2 as input to the function. At line 2, if attached path segments are consecutive, algorithm 2100 returns a Boolean value based on whether S1-segment position is greater than S2 segment position. Otherwise, at line 3, algorithm 2100 returns a Boolean value determined based on whether 51 segment position is less than S2 segment position.

FIG. 22 shows an example of an algorithm for Bezier projection according to aspects of the present disclosure. Algorithm 2200 describes the function Get_Bezier_Projection_on_Edited_Guide, which is called upon in algorithm 2000. The function herein takes Pointp, BezierB and Edited Guide EG as input. At line 2, the Bezier B is extended from the endPoint P and the result is assigned to a variable ExtendedBezier. At line 3, for each Bezier bg of edited Guide EG, algorithm 2200 executes lines 4 to 6. At line 4, algorithm 2200 finds the intersection of ExtendedBezier with b. At line 5, algorithm 2200 checks if the ExtendedBezier intersects with b. In case of intersection, line 6 returns the b Bezier segment number and the intersection T position with respect to EG.

FIG. 23 shows an example of an algorithm for obtaining edited guide segment for distinct Bezier according to aspects of the present disclosure. Algorithm 2300 involves a function Get_Edited_Guide_Seg_For_Distinct_Bezier that uses PathP, SegS and T Position T as inputs. At line 2, a Bezier is represented as p0, p1, p2, p3. Line 3 describes p0 and p3 as p positions. Additionally, p1 is defined as out position of p0 and p2 is defined as in position of p3. At line 4, algorithm 2300 calculates and obtains the Segments of Path P, where the result is assigned to variable Segments. At line 5, algorithm 2300 stores the number of segments in Path P in a variable PathSize. At line 6, the Bezier B is deduced at segment number S and corresponding execution is described in lines 7-10. At line 7, Segments[S].p is assigned to B.p0. At line 8, Segments[S].out is assigned to B.p1. Similarly, at line 9, Segments[(S+1)% PathSize].in is assigned to B.p2. At line 10, Segments[(S+1)% PathSize].p is assigned to B.p3. The operator "%" is to calculate the remainder. For example, 27 is divided by 10 leaves a remainder 7. At line 11, the Bezier B is divided at the T position to get the correct Bezier point and line 12 is then executed. At line 12, the division calls upon function AI_Real_Bezier_Divide. This function takes B and T as input. The result is stored in variables B1 and B2, respectively. At line 13, Edited Guide Segment at T maintains the continuity and prevents the Bezier aesthetics detected as described in lines 14 to 18. At line 14, B1.p1 is assigned to EditedGuideSegment.prev. At line 15, B1.p2 is assigned to EditedGuideSegment.Seg.in. At line 16, the Boolean value based on whether B1.p3 is equal to B2.p0 is then assigned to EditedGuideSegment.Seg.p. At line 17, B2.p1 is assigned to EditedGuideSegment.Seg.out. At line 18, B2.p2 is assigned to EditedGuideSegment.next.

In some embodiments of the present disclosure, the equation notation ("=") means value assignment. For example, a=b means the value of "b" is assigned to variable "a".

FIG. 24 shows an example of an algorithm for obtaining edited guide segment for same Bezier according to aspects of the present disclosure. Algorithm 2400 includes a function Get_Edited_Guide_Seg_For_Same_Bezier which takes PathP, SegS, T position T1 and T2 as inputs. Algorithm 2400 assigns the output of the function Get_Edited_Guide_Seg_For_Distinct_Bezier (P, S, T1) mentioned above in FIG. 23 as B1 and B2, respectively. At line 3, the value of T1 is subtracted from 1 and corresponding result is assigned to the variable RemainingTVal. At line 4, algorithm 2400 is executed to check if T2 is larger than T1, if true, then lines 5-18 are executed. If T2 is larger than T1 is false, lines 20-33 are executed. Referring back to line 5, algorithm 2400 divides the difference of T2 and T1 by RemainingTVal. The result is assigned to a variable TNew. At line 6, algorithm 2400 calls a function AI_Real_Bezier_Divide where B2 and TNew are the inputs to the function. The output values of the function are stored in variables B3 and B4. In line 7, the Edited Guide Segment 1 is set as in lines 8-12. At line 8, $EGS_1$.prev=B1.p1. At line 9, $EGS_1$.Seg.in=B1.p2. At line 10, B1.p3=B3.p0 is evaluated and results in a Boolean value (e.g., true, false). The corresponding Boolean value is assigned to $EGS_1$.Seg.p. At line 11, $EGS_1$.Seg.out=B3.p1. At line 12, $EGS_1$.next=B3.p2. At line 13, the Edited Guide Segment 2 is set as in lines 14-18. At line 14, $EGS_2$.prev=B3.p1. At line 15, $EGS_2$.Seg.in=B3.p2. At line 16, the algorithm is executed to determine whether B4.p0=B3.p3. The Boolean value is then assigned to $EGS_2$.Seg.p. In line 17, $EGS_2$.Seg.out=B4.p1. In line 18, $EGS_2$.next=B4.p2. In line 20, T2 is divided by T1 and the result is stored in variable TNew. At line 21, algorithm 2400 calls the function AI_Real_Bezier_Divide with inputs B1 and TNew. The output of the function is stored in variables B3 and B4 respectively. At line 22, the Edited Guide Segment 1 is set as in lines 23-27. At line 23, $EGS_1$.prev=B4.p1. At line 24, $EGS_1$.Seg.in=B4.p2. In line 25, the algorithm is executed to determine whether B4.p3=B2.p0. The resulting Boolean value is assigned to $EGS_1$.Seg.p. At line 26, $EGS_1$.Seg.out=B2.p1. In line 27, $EGS_1$.next=B2.p2. At line 28, Edited Guide Segment 2 is set as in lines 29-33. At line 29, $EGS_2$.prev=B3.p1. At line 30, $EGS_2$.Seg.in=B3.p2. At line 31, the algorithm is executed to determine whether B3.p3=B4.p0. The resulting Boolean value is assigned to $EGS_2$.Seg.p. In line 32, $EGS_2$.Seg.out=B4.p1. At line 33, $EGS_2$.next=B4.p2.

FIG. 25 shows an example of an algorithm for pre-processing according to aspects of the present disclosure. One or more embodiments of the present disclosure ensure that the path and guide are traversed in the same direction. For example, in case the segment ordering of both path and guide is same (i.e., both are clockwise or anticlockwise) the algorithm including the Edit_Sticked_Path_Recreation_Step function is called upon and executed. Alternatively, when the segment ordering of both path and guide is opposite (i.e., one is clockwise and other is anticlockwise), pre-processing (i.e., algorithm 2500) is performed before executing the algorithm including Edit_Sticked_Path_Recreation_Step (i.e., algorithm 2600).

Algorithm 2500 is directed at pre-processing. At line 1, pre-processing includes a function referred to as Pre_Processing. At line 2, if path segment is anti-clockwise, then algorithm 8 executes lines 3-5. At line 3, the order of segments in the path is reversed. At line 4, for each s segment in the path P, line 5 is executed. At line 5, the in and out position of the segment are also reversed. At line 6, if the path segments of guide are anti-clockwise or if segments are same but the attachment T position is anti-clockwise, algorithm 2500 executes lines 7-10. At line 7, the order of segments in the path is reversed. At line 8, for each s segment in the path P, line 9 is executed. At line 9, the in and out positions of the segment are reversed. At line 10, the previous and next control point position stored in cache are reversed.

FIG. 26 shows an example of an algorithm for path recreation according to aspects of the present disclosure. Algorithm 2600 involves a function Edit_Sticked_Path_Recreation_Step. At line 2, the variable NewPathSegments is initially set to empty. At line 3, first StickedPosition's pSegmentNum is stored in a variable p1. At line 4, for each $s_p$ segment of path object $o_i$ from 0 to p1, line 5 is to be executed. At line 5, the algorithm calls the function NewPathSegments.push($s_p$). At line 6, algorithm 2600 pushes the Edited_Segment_1 in NewPathSegments. At line 7, algorithm 2600 calls the function NewPathSegments.push ($EGS_1$.Seg). At line 8, first StickedPosition's gSegmentNum is assigned to g1. At line 9, last StickedPosition's gSegmentNum is assigned to g2. At line 10, for each $s_g$ segment of guide object G from g1 to g2, the algorithm executes lines 11-15. At line 11, if $s_g$==segment g1, then line 12 is executed, $s_g$.in=$EGS_1$.next. At line 13, if $s_g$==segment g2-1, then line 14 is executed, $s_g$.out=$EGS_1$.prev. At line 15, the algorithm calls the function NewPathSegments.push($s_p$). At line 16, the algorithm pushes Edited_Segment_2 in NewPathSegments. At line 17, the algorithm calls the function NewPathSegments.push($EGS_2$.Seg). At line 18, the last StickedPosition's pSegmentNum is assigned to a variable p2. At line 19, for each $s_p$ segment of path object $o_i$ from p2 to end, line 20 is to be executed. At line 20, algorithm 2600 calls the function NewPathSegments.push($s_p$). At line 21, the algorithm redraws the path with NewPathSegments.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
comparing a vector graphics object with a guide line to obtain an attachment point of the vector graphics object;
modifying the guide line to obtain a curved guide shape;
extending a line through the attachment point to obtain a projected point on the curved guide shape;
dividing the curved guide shape based on the projected point to obtain a partial curve; and
modifying the vector graphics object based on the partial curve to obtain a modified vector graphics object that includes a curve based on the partial curve.

2. The method of claim 1, further comprising:
inserting the guide line parallel to a segment of the vector graphics object; and
associating the guide line with the segment, wherein the vector graphics object is compared to the guide line based on the association.

3. The method of claim 1, further comprising:
associating the guide line with a plurality of vector graphics objects; and
modifying the plurality of vector graphics objects simultaneously based on the curved guide shape to obtain a plurality of modified vector graphics objects corresponding to the plurality of vector graphics objects.

4. The method of claim 1, further comprising:
determining that a segment of the vector graphics object is parallel to the guide line;
determining that an anchor point of the vector graphics object on the segment is within a threshold distance of the guide line; and
generating the attachment point at the anchor point of the vector graphics object.

5. The method of claim 1, wherein adjusting the guide line further comprising:
moving an anchor point of the guide line, wherein the guide line is adjusted based on the movement of the anchor point.

6. The method of claim 1, wherein extending the attachment point further comprising:
identifying an immediately previous point relative to the attachment point on the vector graphics object;
identifying a previous segment of the vector graphics object based on the immediately previous point;
extending the previous segment to intersect with the curved guide shape; and
identifying the projected point at an intersection of the previous segment and the curved guide shape.

7. The method of claim 6, further comprising:
identifying an immediately next point relative to an additional attachment point on the vector graphics object;
identifying a next segment of the vector graphics object based on the immediately next point;
extending the next segment to intersect with the curved guide shape; and
identifying an additional projected point at an intersection of the next segment and the curved guide shape.

8. The method of claim 1, wherein dividing the curved guide shape further comprises:
identifying a first curve that overlaps a length of the curved guide shape and has an end point at the projected point.

9. The method of claim 1, wherein modifying the vector graphics object further comprises:
removing a segment of the vector graphics object that overlaps the attachment point; and
including the partial curve in the modified vector graphics object.

10. The method of claim 1, wherein:
the guide line comprises a straight line.

11. The method of claim 1, wherein:
the curved guide shape is a parametric Bezier curve.

12. A method for image processing, comprising:
comparing a vector graphics object with a guide line to obtain an attachment point of the vector graphics object;
modifying the guide line to obtain a curved guide shape;
identifying an immediately previous point relative to the attachment point on the vector graphics object;
identifying a previous segment of the vector graphics object based on the immediately previous point;
extending the previous segment to obtain a projected point that intersects with the curved guide shape;
dividing the curved guide shape based on the projected point to obtain a partial curve;
removing a segment of the vector graphics object that overlaps the attachment point; and
including the partial curve in the vector graphics object to obtain a modified vector graphics object that includes a curve based on the partial curve.

13. An apparatus for image processing, comprising:
an attachment component configured to compare a vector graphics object with a guide line to obtain an attachment point of the vector graphics object;
a guide line component configured to modify the guide line to obtain a curved guide shape;
a projection component configured to extend the attachment point to obtain a projected point on the curved guide shape;
a partial curve component configured to divide the curved guide shape based on the projected point to obtain a partial curve; and
a modification engine configured to modify the vector graphics object based on the partial curve to obtain a modified vector graphics object that includes a curve based on the partial curve.

14. The apparatus of claim 13, wherein:
the attachment component is configured to determine that a segment of the vector graphics object is parallel to the guide line, determine that an anchor point of the vector graphics object on the segment is within a threshold distance of the guide line, and generate the attachment point at the anchor point of the vector graphics object.

15. The apparatus of claim 13, wherein:

the guide line component is configured to move an anchor point of the guide line, wherein the guide line is adjusted based on the movement of the anchor point.

16. The apparatus of claim 13, wherein:

the projection component is configured to identify an immediately previous point relative to the attachment point on the vector graphics object, identify a previous segment of the vector graphics object based on the immediately previous point, extend the previous segment to intersect with the curved guide shape, and identify the projected point at an intersection of the previous segment and the curved guide shape.

17. The apparatus of claim 16, wherein:

the projection component is configured to identify an immediately next point relative to an additional attachment point on the vector graphics object, identify a next segment of the vector graphics object based on the immediately next point, extend the next segment to intersect with the curved guide shape, and identify an additional projected point at an intersection of the next segment and the curved guide shape.

18. The apparatus of claim 13, wherein:

the partial curve component is configured to identify a first curve that overlaps a length of the curved guide shape and has an end point at the projected point.

19. The apparatus of claim 13, wherein:

the modification engine is configured to remove a segment of the vector graphics object that overlaps the attachment point, and include the partial curve in the modified vector graphics object.

20. The apparatus of claim 13, wherein:

the modification engine is configured to modify a plurality of vector graphics objects simultaneously based on the curved guide shape to obtain a plurality of modified vector graphics objects corresponding to the plurality of vector graphics objects.

\* \* \* \* \*